United States Patent
Fair

(10) Patent No.: US 7,631,148 B2
(45) Date of Patent: Dec. 8, 2009

(54) ADAPTIVE FILE READAHEAD BASED ON MULTIPLE FACTORS

(75) Inventor: Robert L. Fair, Cary, NC (US)

(73) Assignee: NetApp, Inc., Sunnyvale, CA (US)

( * ) Notice: Subject to any disclaimer, the term of this patent is extended or adjusted under 35 U.S.C. 154(b) by 350 days.

(21) Appl. No.: 10/753,608

(22) Filed: Jan. 8, 2004

(65) Prior Publication Data

US 2005/0154825 A1 Jul. 14, 2005

(51) Int. Cl.
*G06F 12/08* (2006.01)
*G06F 15/16* (2006.01)

(52) U.S. Cl. ...................................... 711/137; 709/231

(58) Field of Classification Search ........................ None
See application file for complete search history.

(56) References Cited

U.S. PATENT DOCUMENTS

| | | | |
|---|---|---|---|
| 4,489,378 A | 12/1984 | Dixon et al. | |
| 5,146,578 A | 9/1992 | Zangenehpour | |
| 5,371,870 A * | 12/1994 | Goodwin et al. | 710/52 |
| 5,381,539 A | 1/1995 | Yanai et al. | |
| 5,649,156 A * | 7/1997 | Vishlitzky et al. | 711/136 |
| 5,819,292 A | 10/1998 | Hitz et al. | |
| 5,913,028 A * | 6/1999 | Wang et al. | 709/203 |
| 5,963,962 A | 10/1999 | Hitz et al. | |
| 6,026,452 A * | 2/2000 | Pitts | 710/56 |
| 6,038,570 A | 3/2000 | Hitz et al. | |
| 6,216,208 B1 * | 4/2001 | Greiner et al. | 711/137 |
| 6,260,115 B1 * | 7/2001 | Permut et al. | 711/134 |
| 6,484,239 B1 * | 11/2002 | Hill et al. | 711/137 |
| 6,523,093 B1 * | 2/2003 | Bogin et al. | 711/137 |
| 6,567,894 B1 * | 5/2003 | Hsu et al. | 711/137 |

OTHER PUBLICATIONS

U.S. Appl. No. 10/721,596, filed Nov. 25, 2003, Robert L. Fair.
DAFS Collaborative, DAFS: Direct Access File System Protocol, Version 1.00, Revision Date Sep. 1, 2001, pp. 1-358.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
"Notification of Transmittal of the International Search Report and The Written Opinion of the International Searching Authority, or the Declaration", International Application No. PCT/US2005/000203 with an International Filing date of Jun. 1, 2005.

* cited by examiner

*Primary Examiner*—Gary Portka
(74) *Attorney, Agent, or Firm*—Cesari and McKenna, LLP

(57) ABSTRACT

A storage system is provided that implements a file system configured to optimize the amount of readahead data retrieved for each read stream managed by the file system. The file system relies on various factors to adaptively select an optimized readahead size for each read stream. Such factors may include the number of read requests processed in the read stream, an amount of client-requested data requested in the read stream, a read-access style associated with the read stream, and so forth. The file system is also configured to minimize cache pollution by adaptively selecting when readahead operations are performed for each read stream and determining how long each read stream's retrieved data is retained in memory.

33 Claims, 12 Drawing Sheets

500

| FILE SIZE | NUMBER OF READ SETS |
|---|---|
| < 64 kB | 0 |
| 64 kB–512 kB | 1 |
| 512 kB–50 MB | 2 |
| 50 MB–1 GB | 5 |
| 1 GB–10 GB | 10 |
| > 10 GB | 15 |

READ SET 600

| | |
|---|---|
| NEXT POINTER | 602 |
| LEVEL | 604 |
| COUNT | 606 |
| LAST READ OFFSET | 608 |
| LAST READ SIZE | 610 |
| READAHEAD SIZE | 612 |
| NEXT READAHEAD | 614 |
| FLAGS | 616 |

FIG. 6

ADAPTIVE FILE READAHEAD BASED ON MULTIPLE FACTORS

RELATED APPLICATIONS

The application is related to U.S. application Ser. No. 10/721,596, entitled ADAPTED FILE READAHEAD TECHNIQUE FOR MULTIPLE READ STREAMS, by Robert L. Fair, the teachings of which are expressly incorporated herein by reference.

FIELD OF THE INVENTION

The present invention relates to storage systems and, more specifically, to a technique for a storage system to adaptively adjust its readahead operations for multiple read streams.

BACKGROUND OF THE INVENTION

A storage system is a computer that provides storage service relating to the organization of information on storage devices, such as disks. The storage system includes a storage operating system that logically organizes the information as a set of data blocks stored on the disks. In a block-based deployment, such as a conventional storage area network (SAN), the data blocks may be directly addressed in the storage system. However, in a file-based deployment, such as a network attached storage (NAS) environment, the operating system implements a file system to logically organize the data blocks as a hierarchical structure of addressable files and directories on the disks. In this context, a directory may be implemented as a specially formatted file that stores information about other files and directories.

The storage system may be configured to operate according to a client/server model of information delivery to thereby allow many client systems (clients) to access shared resources, such as files, stored on the storage system. The storage system is typically deployed over a computer network comprising a geographically distributed collection of interconnected communication links, such as Ethernet links, that allow clients to remotely access the shared information (e.g., files) on the storage system. The clients typically communicate with the storage system by exchanging discrete frames or packets of data formatted according to predefined network communication protocols, such as the Transmission Control Protocol/Internet Protocol (TCP/IP). In this context, a protocol consists of a set of rules defining how the interconnected computer systems interact with one another.

In a file-based deployment, clients employ a semantic level of access to files and file systems stored on the storage system. For instance, a client may request to retrieve ("read") or store ("write") information in a particular file stored on the storage system. Clients typically request the services of the file-based storage system by issuing file-system protocol messages (in the form of packets) formatted according to conventional file-based access protocols, such as the Common Internet File System (CIFS), the Network File System (NFS) and the Direct Access File System (DAFS) protocols. The client requests identify one or more files to be accessed without regard to specific locations, e.g., data blocks, in which the requested data are stored on disk. The storage system converts the received client requests from file-system semantics to corresponding ranges of data blocks on the storage disks. In the case of a client "read" request, data blocks containing the client's requested data are retrieved and the requested data is then returned to the client.

In a block-based deployment, client requests can directly address specific data blocks in the storage system. Some block-based storage systems organize their data blocks in the form of databases, while other block-based systems may store their blocks internally in a file-oriented structure. Where the data is organized as files, a client requesting information maintains its own file mappings and manages file semantics, while its requests (and corresponding responses) to the storage system address the requested information in terms of block addresses on disk. In this manner, the storage bus in the block-based storage system may be viewed as being extended to the remote client systems. This "extended bus" is typically embodied as Fibre Channel (FC) or Ethernet media adapted to operate with block-based access protocols, such as the Small Computer Systems Interface (SCSI) protocol encapsulated over FC (FCP) or encapsulated over TCP/IP/Ethernet (iSCSI).

Each storage device in the block-based system is typically assigned a unique logical unit number (lun) by which it can be addressed, e.g., by remote clients. Thus, an "initiator" client system may request a data transfer for a particular range of data blocks stored on a "target" lun. Illustratively, the client request may specify a starting data block in the target storage device and a number of successive blocks in which data may be stored or retrieved in accordance with the client request. For instance, in the case of a client "read" request, the requested range of data blocks is retrieved and then returned to the requesting client.

In general, a file system does not directly access "on-disk" data blocks, e.g., assigned respective disk block numbers (dbn) in a dbn address space. Instead, there is typically a one-to-one mapping between data blocks stored on disk, e.g., in a dbn address space, and the same data blocks organized by the file system, e.g., in a volume block number (vbn) space. For instance, N on-disk data blocks may be managed within the file system by assigning each data block to a unique vbn between zero and N−1. Furthermore, the file system may associate a set of data blocks (i.e., vbns) with a file or directory managed by the file system. In this case, the file system may attribute each data block in the file or directory with a corresponding "file offset" or file block number (fbn). Illustratively, the file offsets in the file or directory may be measured in units of fixed-sized data blocks, e.g., 4 kilobyte (kB) blocks, and therefore can be mapped one-to-one to fbn numbers in that file or directory. Accordingly, each file or directory is defined within the file system as a sequence of data blocks assigned to consecutively numbered fbns, e.g., where the first data block in each file or directory is assigned to a predetermined starting fbn number, such as zero. Here, it is noted that the file system assigns sequences of fbn numbers on a per-file basis, whereas the file system assigns vbn numbers over a typically larger volume address space.

A read stream is defined as a set of one or more client requests that instructs the storage system to retrieve data from a logically contiguous range of file offsets within a requested file. In other words, after the read stream's first request is received, every subsequent client request in the read stream logically "extends" a contiguous sequence of file offsets in the file accessed by the stream's previous request. Accordingly, a read stream may be construed by the file system as a sequence of client requests that directs the storage system to retrieve a sequence of data blocks assigned to consecutively numbered fbns. For instance, the first request in the read stream may retrieve a first set of data blocks assigned to the fbns 10 through 19, the stream's second request may retrieve data blocks whose fbns equal 20 through 25, the third request may retrieve the data blocks assigned to the fbns 26 through 42, and so on. It is noted that client requests in the read stream may employ file-based or block-based semantics, so long as they instruct the storage system to retrieve data from the stream's logically contiguous range of file offsets.

Operationally, the storage system typically identifies a read stream based on an ordered sequence of client accesses to the same file. As used hereinafter, a file is broadly understood as any set of data in which zero or more read streams can be established. Accordingly, the file may be a traditional file or directory stored on a file-based storage system. Conventionally, the storage system can only monitor one file read stream at a time. To that end, the storage system determines whether a client's currently requested file data requires the storage system to retrieve a set of data blocks that logically extends a read stream already established in the file. If so, the client request may be associated with the read stream, and the read stream may be extended by the number of retrieved data blocks.

Upon identifying a read stream, the storage system may employ speculative readahead operations to retrieve data blocks that are likely to be requested by future client read requests. These "readahead" blocks are typically retrieved from disk and stored in memory (i.e., buffer cache) in the storage system, where each readahead data block is associated with a different file-system vbn. Conventional readahead algorithms are often configured to "prefetch" a predetermined number of data blocks that logically extend the read stream. For instance, for a read stream whose client read requests retrieve a sequence of data blocks assigned to consecutively numbered fbns, the file system may invoke readahead operations to retrieve additional data blocks assigned to fbns that further extend the sequence, even though the readahead blocks have not yet been requested by client requests in the read stream.

Typically, the readahead operations are "triggered" whenever a file's read stream reaches one of a predefined set of file offsets or memory addresses. For example, suppose the predefined set of file offsets consist of every $32^{nd}$ file offset in the file (i.e., file block numbers 0, 32, 64, etc.). Further suppose that an existing read stream begins at fbn number 4 and extends to fbn number 27. If a client read request is received that instructs the storage system to retrieve fbn numbers 28 through 34, the request extends the read stream past the predefined fbn number 32, thereby triggering readahead operations. Accordingly, the conventional readahead algorithm retrieves a predetermined number of data blocks, e.g., 288 data blocks, beginning with fbn number 35, from disk for storage in cache in anticipation of future read requests in that read stream.

While conventional readahead algorithms work well in certain situations, they generally suffer various disadvantages. For instance, the conventional algorithms retrieve a fixed number of readahead data blocks, e.g., 288 data blocks, which may be an inappropriate number of data blocks to prefetch for some read streams. That is, the fixed number of readahead data blocks may be an excessive amount of data to retrieve for relatively small file read streams. On the other hand, larger file read streams may benefit from more aggressive readahead sizes. Further, the fixed number of readahead data blocks may be inappropriate for other reasons as well. For instance, if the read stream contains client read requests that request relatively small amounts of data, then retrieval of a large fixed number of readahead data blocks may be disproportionate with respect to the relatively small amounts of client-requested data.

In addition, conventional readahead algorithms that employ a relatively large fixed number of readahead data blocks may consume an excessive amount of buffer memory in the storage system. This excessive memory usage, or "cache pollution," may cause the storage system to consume memory and resources that are needed for other system operations, and consequently may negatively impact the system's performance. For example, such cache pollution may increase the latency of data retrieval from the buffer memory since the storage system has to search a large number of "in-core" buffers containing readahead data.

It is therefore desirable for the storage system to implement a readahead algorithm that can adjust the amount of readahead data it retrieves for one or more read streams. The readahead algorithm should be configured to reduce cache pollution in the storage system.

SUMMARY OF THE INVENTION

The present invention provides a storage system that implements a file system configured to optimize the amount of readahead data retrieved for each read stream managed by the file system. The file system relies on various factors to adaptively select an optimized readahead size for each read stream. Such factors may include the number of read requests processed in the read stream, an amount of client-requested data requested in the read stream, a read-access style associated with the read stream, and so forth. The file system is also configured to minimize cache pollution by adaptively selecting when readahead operations are performed for each read stream and determining how long each read stream's retrieved data is retained in memory.

According to an illustrative embodiment, the file system manages a separate set of readahead metadata for each read stream. Consequently, the file system can individually adjust readahead operations for each read stream by appropriately modifying configuration parameters stored in the read stream's associated set of metadata. For instance, each read stream's associated set of readahead metadata may include, inter alia, an indication of when readahead operations are performed, an amount of readahead data to retrieve and an indication of how long the retrieved readahead data should be retained in buffer cache. Advantageously, the contents of the read stream's associated set of readahead metadata may be dynamically adjusted as client requests are processed so as to optimize the amount of readahead data that is prefetched and minimize cache pollution in the storage system.

Further to the illustrative embodiment, each set of readahead metadata is stored in a corresponding readset data structure. The file system allocates a different set of zero or more readsets for each requested file in the storage system. In this way, each requested file can support a number of concurrent read streams equal to its number of allocated readsets (i.e., one read stream per readset). In the illustrative embodiment, a file's readsets are dynamically allocated in response to receiving an initial request to read data in the file. Preferably, the number of allocated readsets increases as the file's size increases.

BRIEF DESCRIPTION OF THE DRAWINGS

The above and further advantages of the invention may be better understood by referring to the following description in conjunction with the accompanying drawings in which like reference numerals indicate identically or functionally similar elements:

FIG. 5 is a schematic block diagram of an illustrative table that may be used to determine the number of readsets that may be allocated for a file or directory based on the size of the file or directory;

FIG. 6 is a schematic block diagram of an illustrative readset that advantageously may be employed in accordance with the present invention;

DETAILED DESCRIPTION OF ILLUSTRATIVE EMBODIMENTS

A. Storage System

Figure 1:
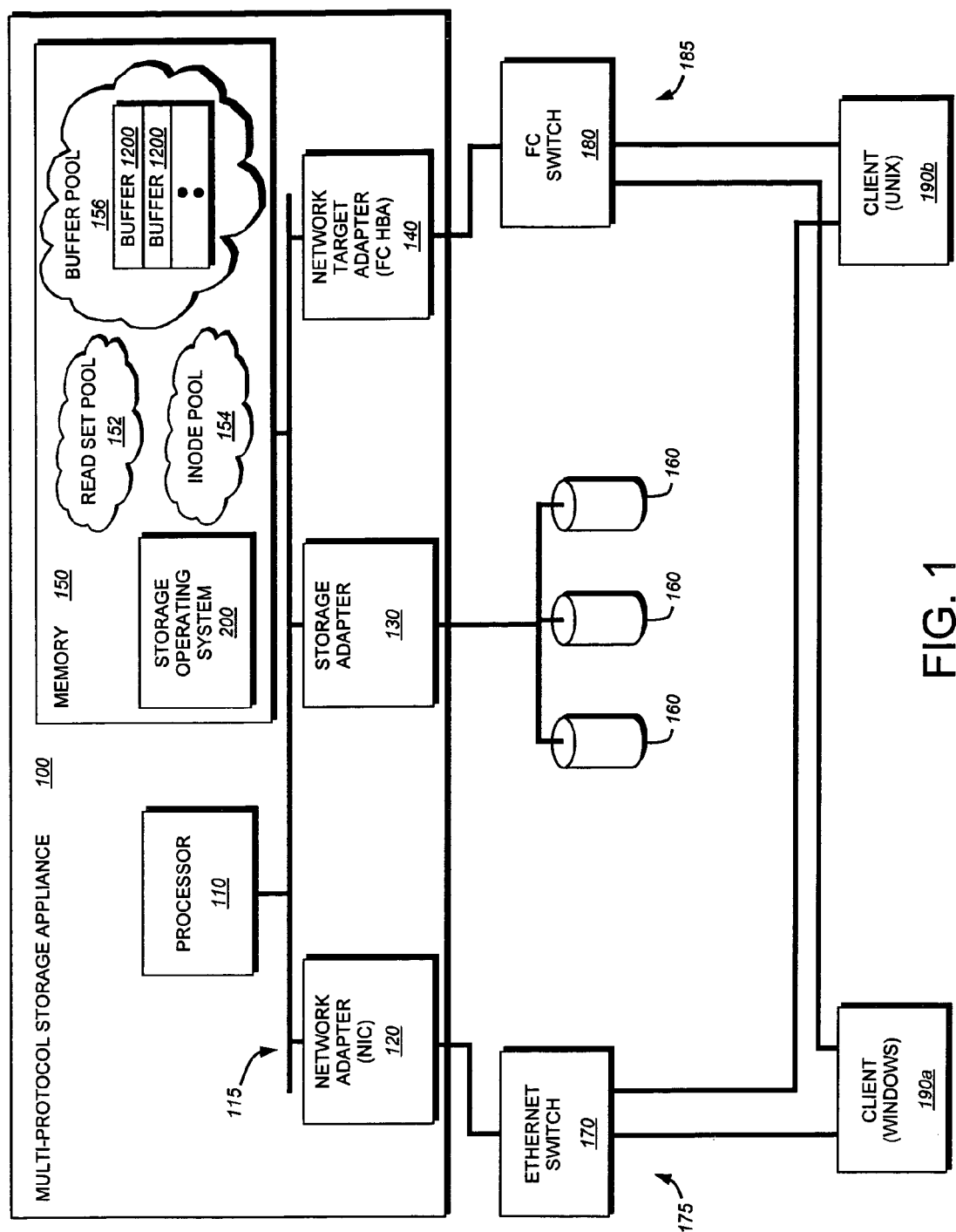
FIG. 1 is a schematic block diagram of an illustrative multiprotocol storage appliance environment that may be employed in accordance with the present invention.

FIG. 1 is a schematic block diagram of the multiprotocol storage appliance 100 configured to provide storage service relating to the organization of information on storage devices, such as disks 160. The storage disks may be arranged in various configurations, such as a redundant array of independent disks (RAID). The storage appliance 100 is illustratively embodied as a storage system comprising a processor 110, a memory 150, a plurality of network adapters 120, 140 and a storage adapter 130 interconnected by a system bus 115.

In the illustrative embodiment, the memory 150 comprises storage locations that are addressable by the processor 110 and adapters 120, 140 for storing software program code and data structures associated with the present invention. Portions of the memory may be organized as an inode "pool" 154 containing one or more inode data structures and a readset pool 152 containing readset data structures. Another portion of the memory may be further organized as a buffer cache 156 containing data buffers 1200. The processor and adapters may comprise processing elements and/or logic circuitry configured to execute the software code and manipulate the data structures stored in the memory 150. A storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

To facilitate access to the disks 160, the storage operating system 200 implements a write-anywhere file system that cooperates with virtualization modules to "virtualize" the storage space provided by disks 160. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

As used herein, the term "storage operating system" generally refers to the computer-executable code operable on a computer that manages data access and may, in the case of a multiprotocol storage appliance, implement data access semantics. The storage operating system can be implemented as a microkernel, like the Data ONTAP™ operating system available from Network Appliance, Inc., Sunnyvale, Calif. The storage operating system can also be implemented as an application program operating over a general-purpose operating system, such as UNIX® or Windows NT®, or as a general-purpose operating system with configurable functionality, which is configured for storage applications as described herein. It is expressly contemplated that any appropriate storage operating system may be enhanced for use in accordance with the inventive principles described herein.

The storage adapter 130 cooperates with the storage operating system 200 executing on the storage appliance to access information requested by the clients 190. The information may be stored on the disks 160 or other similar media adapted to store information. The storage adapter includes input/output (I/O) interface circuitry that couples to the disks over an I/O interconnect arrangement, such as a conventional Fibre Channel (FC) serial link topology. The information is retrieved by the storage adapter and, if necessary, processed by the processor 110 (or the adapter 130 itself) prior to being forwarded over the system bus 115 to the network adapters 120, 140, where the information is formatted into packets or messages and returned to the clients.

The network adapter 120 couples the storage appliance 100 to a plurality of clients 190a,b over, e.g., point-to-point links, wide area networks (WANs), virtual private networks (VPNs) implemented over a public network (e.g., the Internet) or shared local area networks (LANs), such as the illustrative Ethernet network 175. Therefore, the network adapter 120 may comprise a network interface card (NIC) having the mechanical, electrical and signaling circuitry needed to connect the appliance to a network switch, such as a conventional Ethernet switch 170. For this NAS-based network environment, the clients are configured to access information stored on the multiprotocol appliance as files. The clients 190 communicate with the storage appliance over the network 175 by exchanging discrete frames or packets of data according to predefined protocols, such as the Transmission Control Protocol/Internet Protocol (TCP/IP).

The clients 190 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 190 may request the services of the storage appliance 100 by issuing file access protocol messages (in the form of packets) to the appliance over the network 175. For example, a client 190a running the Windows operating system may communicate with the storage appliance 100 using the Common Internet File System (CIFS) protocol over TCP/IP. On the other hand, a client 190b running the UNIX operating system may communicate with the multiprotocol appliance using either the Network File System (NFS) protocol over TCP/IP or the Direct Access File System (DAFS) protocol over a virtual interface (VI) transport in accordance with a remote direct memory access (RDMA) protocol over TCP/IP. It will be apparent to those skilled in the art that clients running other types of operating systems may also communicate with the integrated multiprotocol storage appliance using other file access protocols.

The storage network "target" adapter 140 couples the multiprotocol storage appliance 100 to clients 190 that may be configured to access the stored information as blocks, disks or logical units. For this SAN-based network environment, the storage appliance is coupled to an illustrative FC network 185. FC is a networking standard describing a suite of protocols and media that is primarily found in SAN deployments. The network target adapter 140 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload Fibre Channel network processing operations for the storage appliance.

The clients 190 generally utilize block-based access protocols, such as the Small Computer Systems Interface (SCSI) protocol, when accessing information, e.g., in the form of blocks or disks, over a SAN-based network. SCSI is a peripheral I/O interface with a standard, device independent protocol that allows different peripheral devices, such as disks 160, to attach to the storage appliance 100. In SCSI terminology, clients 190 operating in a SAN environment are initiators that initiate requests and commands for data. The multiprotocol storage appliance is thus a target configured to respond to the requests issued by the initiators in accordance with a request/response protocol. When clients send SAN-based data access requests to the storage appliance, clients typically utilize logical block addresses that correspond to individual data blocks stored on the disks 160.

The multiprotocol storage appliance 100 supports various SCSI-based protocols used in SAN deployments, including SCSI encapsulated over TCP/IP (iSCSI) and SCSI encapsulated over FC (FCP). The initiators (hereinafter clients 190) may thus request the services of the target (hereinafter storage appliance 100) by issuing iSCSI and FCP messages over the network 175, 185 to access information stored on the disks. It will be apparent to those skilled in the art that the clients may also request the services of the integrated multiprotocol storage appliance using other block access protocols. By supporting a plurality of block access protocols, the multiprotocol storage appliance provides a unified and coherent access solution to disks and logical units in a heterogeneous SAN environment.

B. Storage Operating System

Figure 2:
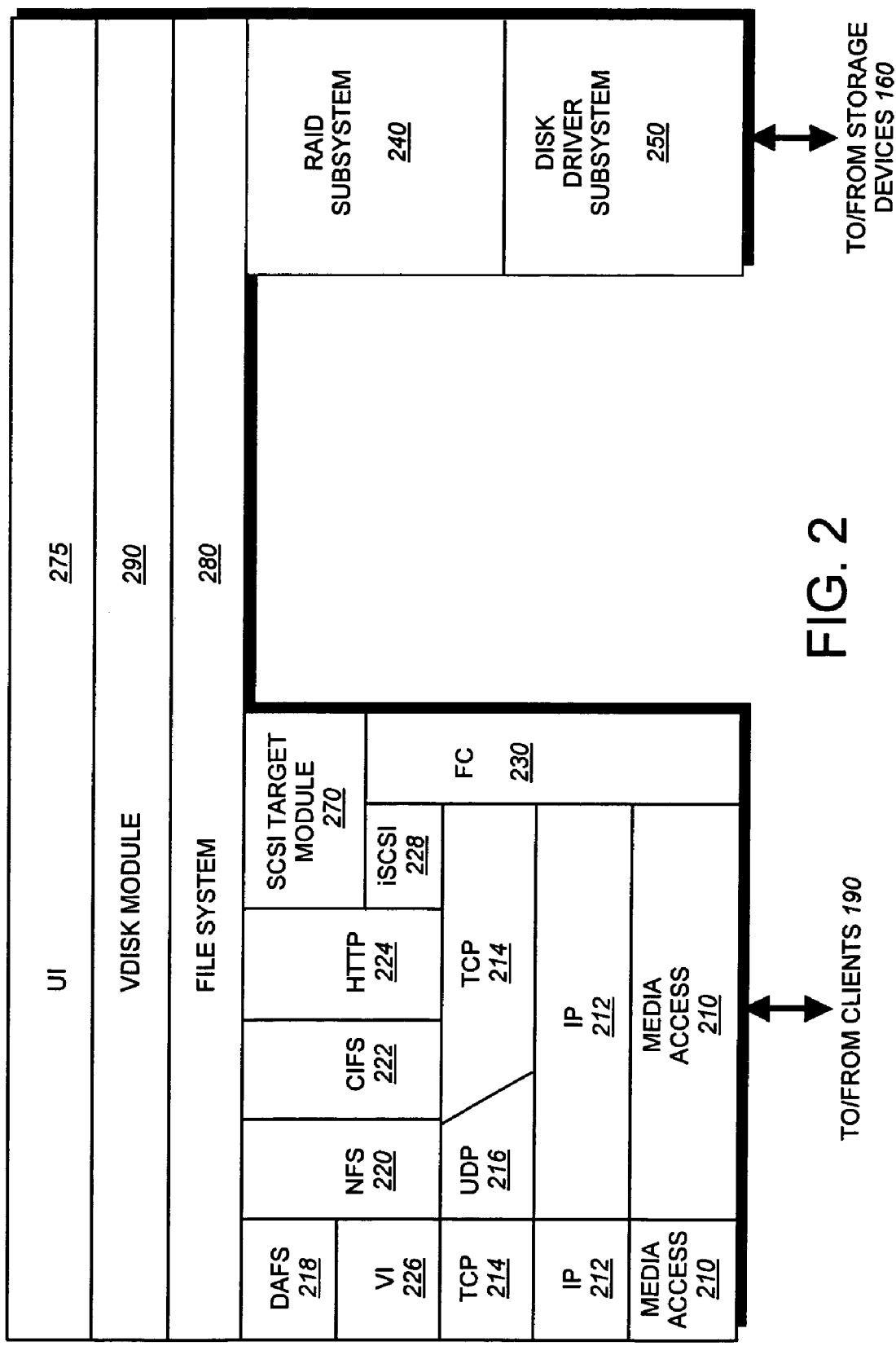
FIG. 2 is a schematic block diagram of an exemplary storage operating system of that may be advantageously used with the present invention.

FIG. 2 is a schematic block diagram of an exemplary storage operating system 200 that may be advantageously used with the present invention. The storage operating system comprises a series of software layers organized to form an integrated network protocol stack or, more generally, a multiprotocol engine that provides data paths for clients to access information stored on the multiprotocol storage appliance 100 using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multiprotocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block-based protocol access over the TCP/IP network protocol layers, while a FC driver layer 230 operates with the FC HBA 140 to receive and transmit block access requests and responses to and from the clients 190a,b. The FC and iSCSI drivers provide FC-specific and iSCSI-specific access control to the storage disks 160 and other logical units. In addition, the storage operating system 200 includes a RAID subsystem 240 that may implement a disk storage protocol, such as a RAID protocol, as well as a disk driver subsystem 250 for retrieving data blocks from the storage disks 160 in accordance with a disk access protocol such as, e.g., a SCSI protocol.

Bridging the disk software layers 240 and 250 with the integrated network protocol stack layers 210-230 is a virtualization system that is implemented by a storage manager or file system 260 interacting with virtualization modules illustratively embodied as, e.g., virtual disk ("vdisk") module 270 and SCSI target module 235. The vdisk module 270 is layered on the file system 260 to enable access by administrative interfaces, such as a user interface (UI) 275, in response to a user (system administrator) issuing commands to the storage system. The SCSI target module 235 is disposed between the FC and iSCSI drivers 228, 230 and the file system 260 to provide a translation layer of the virtualization system between the block (lun) space and the file-system space, where luns are represented as virtual disks. The UI 275 is disposed over the storage operating system in a manner that enables administrative or user access to various layers and subsystems, such as the RAID subsystem 240.

The file system 260 is illustratively a message-based system that provides volume management capabilities used to access information stored on the storage devices, such as the disks 160. That is, in addition to providing file-system semantics, the file system 260 provides functions normally associated with a volume manager. These functions include (i) aggregation of the disks, (ii) aggregation of storage bandwidth of the disks, and (iii) reliability guarantees, such as mirroring and/or parity (RAID). The file system 260 illustratively implements the Write Anywhere File Layout (WAFL™) file system, which is available from Network Appliance, Inc. and organizes its on-disk data using fixed-sized, e.g., 4 kilobyte (kB) blocks. The illustrative file system 260 uses index nodes ("inodes") to identify files and store file attributes (such as creation time, access permissions, size, and block location). The use of inodes, including an inode file, is described in more detail in U.S. Pat. No. 5,819,292, entitled Method for Maintaining Consistent States of a File System and for Creating User-Accessible Read-Only Copies of a File System by David Hitz, et al., issued Oct. 6, 1998, which patent is hereby incorporated by reference as though fully set forth herein.

Figure 3:
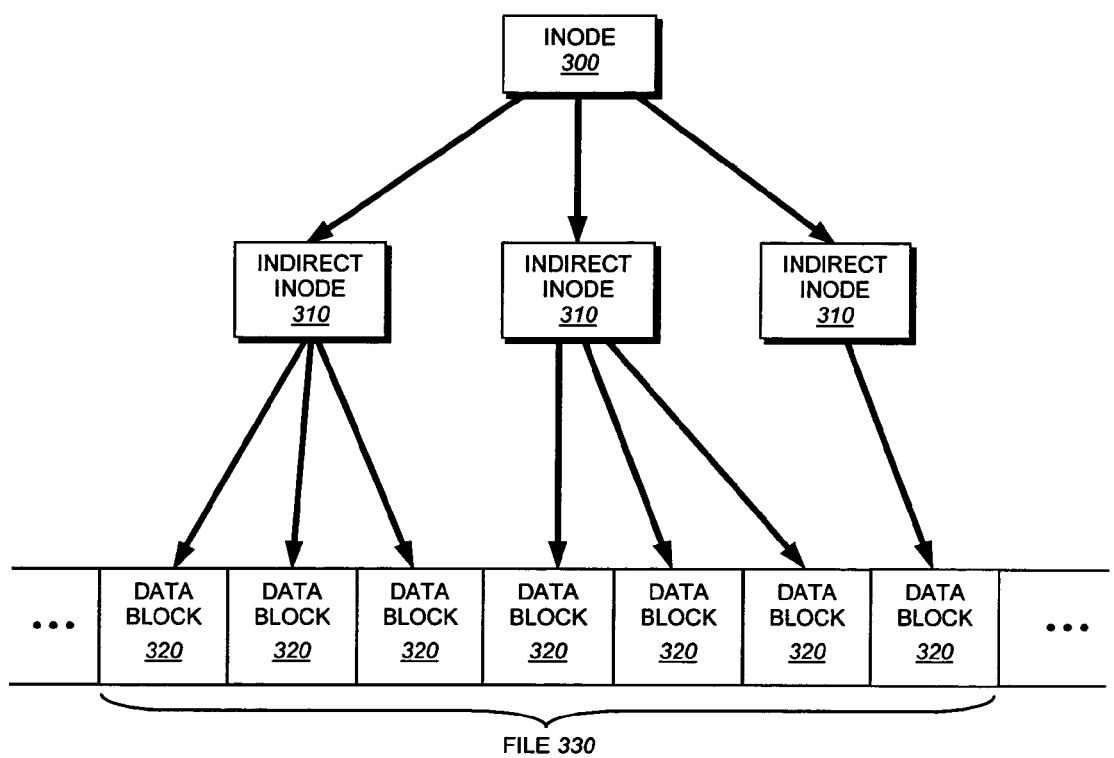
FIG. 3 is a schematic block diagram of an exemplary buffer tree that may be associated with a file or directory in the illustrative multiprotocol storage appliance.

FIG. 3 is a schematic block diagram of a buffer tree of file 330. The buffer tree is an internal representation of blocks of the file stored in memory. The buffer tree comprises a top-level inode 300 that contains metadata describing the file 330, and depending upon the size of the file, also contains pointers referencing the data blocks 320, e.g., 4 kB data blocks, that store the actual data of the file. In particular, for a large file (e.g., greater than 64 kB of data), each pointer in the inode 300 may reference an indirect (level 1) block 310 that contains up to 1024 pointers, each of which can reference a data block 320. By way of example, each pointer in the indirect blocks 310 may store a value identifying a vbn that corresponds to a data block 320 in the file system 260.

Operationally, the file system 260 receives client requests which have been processed by various software layers of the integrated network protocol stack. For example, a client request received at a network adapter 120 or 140 may be processed by a network driver (of layer 210 or 230) which, when appropriate, forwards the request to network protocol and file access layers 212-228 for additional processing. The client request is then formatted as a file-system "message" that can be passed to the file system 260. The message may specify, among other things, a client-requested file or directory (e.g., typically represented by an inode number), a starting offset within the requested file or directory, and a length of data to write or retrieve following the starting offset.

Because the file system 260 manipulates on-disk data in units of fixed-sized data blocks, e.g., 4 kB blocks, the file system may have to convert the (inode, offset, length) values received in the file-system message into units of data blocks (e.g., fbns), if they are not already so formatted. For example, suppose an 8 kB client-requested file occupies two consecutive 4 kB on-disk data blocks which are assigned fbns equal to 11 and 12, respectively. Further assume that these two data blocks are accessible through a set of pointers stored in an inode whose inode number equals 17. Next, suppose that a client requests to access the latter 6 kB of the file's data, i.e., the last 2 kB in fbn number 11 and the entire 4 kB in fbn number 12. In this case, the file system 260 may receive a file-system message that identifies the requested data as: (inode=17, file offset=2 kB, length=6 kB). Since the file system manipulates data in units of data blocks, the file system converts the received file offset and length values into units of data blocks so as to identify which data blocks contain the client-requested data, e.g., (inode=17, starting data block=fbn 11, data blocks to read=2 blocks).

Having identified which data blocks, e.g., fbns 11 and 12, store the client-requested data, the file system 260 determines whether the client-requested data blocks are accessible in one or more of the "in-core" buffers. If so, the file system retrieves the requested data from memory 150 and processes the retrieved data in accordance with the client request. However, if the requested data is not resident in the in-core memory 150, the file system 260 generates operations to load (retrieve) the requested data from the storage disks 160. The file system passes a message structure identifying the vbn numbers assigned to the client-requested data blocks (i.e., fbns 11 and 12) to the RAID subsystem 240, which maps the vbns to corresponding disk block numbers (dbn) and sends the latter to an appropriate driver (e.g., SCSI) of the disk driver subsystem 250. The disk driver accesses the requested dbns from the disks 160 and loads the requested data block(s) in memory 150 for processing by the file system 260.

In addition to retrieving data blocks containing the client-requested data, the file system 260 also may instruct the disk software layers 240 and 250 to retrieve additional "readahead" data blocks from the disks 160. These readahead data blocks may correspond to a range of data blocks (e.g., fbns) that logically extend a read stream containing the received client request, although the readahead blocks themselves have not yet been requested. Like the client-requested data blocks, the readahead data blocks are retrieved by the disk software layers 240 and 250 and copied into appropriate memory buffers accessible to the file system 260. Such memory buffers may be obtained from the buffer cache 156. The file system may access (i.e., read or write) the client-requested data in the retrieved data blocks in accordance with the client's request, and, when appropriate, return the requested data and/or an acknowledgement message back to the requesting client 190.

C. Readsets

As used herein, a "read stream" is defined as a set of one or more client requests that instructs the storage operating system 200 to retrieve data from a logically contiguous range of file offsets (e.g., fbns) within a requested file. The operating system may employ speculative readahead operations for prefetching one or more data blocks that are likely to be requested in the read stream by future client read requests. In accordance with an illustrative embodiment, the storage operating system 200 maintains a separate set of readahead metadata for each of a plurality of concurrently managed read streams. The operating system also stores each read stream's metadata in a separate "readset" data structure (i.e., one read stream per readset). Accordingly, a file or directory supporting multiple concurrent read streams may be associated with a plurality of different readsets, e.g., accessible through an inode associated with the file or directory.

Figure 4:
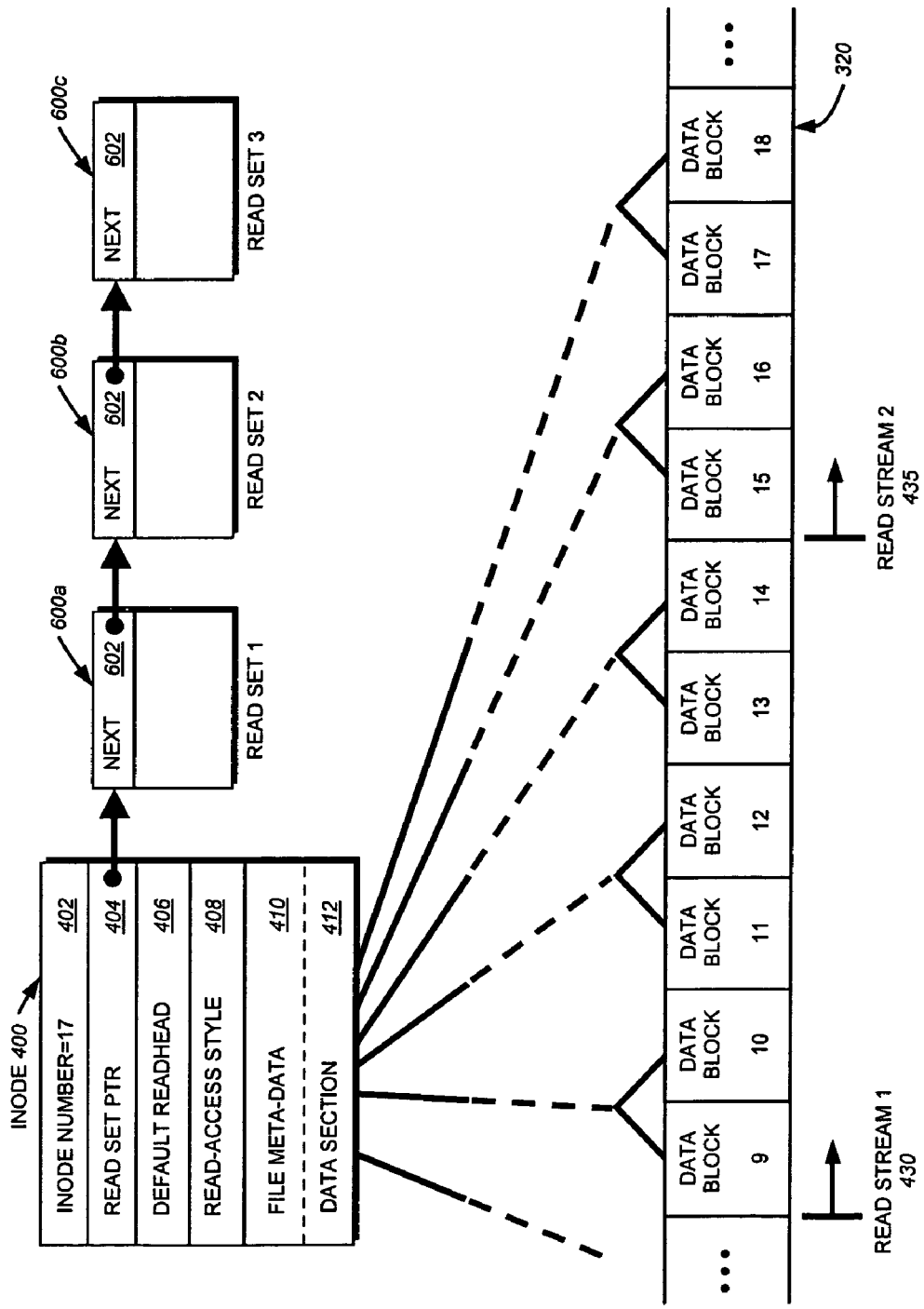
FIG. 4 is a schematic block diagram of an inode and an exemplary set of readset data structures that may be used to store readahead metadata for read streams established in the inode's associated file or directory.

FIG. 4 illustrates an exemplary inode 400 and its associated set of readsets 600a-c. The inode 400 comprises, inter alia, an inode number 402 (or other identifier), a readset pointer 404, a read-access style 406, a default readahead value 408, file metadata 410 and a data section 412. The inode 400 may be dynamically allocated or obtained from the inode pool 154 in response to the storage operating system 200 receiving a client request to access data in the inode's associated file or directory. The inode number 402, e.g., which equals 17 in this example, may be used to uniquely identify the file or directory associated with the inode 400. For instance, the client request may specify an inode number whose associated file or directory contains a particular range of data that the client desires to access. The client-specified inode number may be coupled with an indication of a starting offset in the file and a length of data to access beginning at the starting is offset.

The readset pointer 404 stores a value that indicates the memory location of zero or more readset data structures 600. In operation, the file system 260 may dynamically allocate the readsets or acquire previously allocated readsets from a readset pool 152. Each readset allocated for the inode 400 may be initialized to store a predetermined set of values. Illustratively, the readsets 600a-c associated with the inode 400 are arranged as a linked list, wherein each readset comprises a "next" pointer 602 that stores a value indicating the memory location of a next readset in the list. The next pointer in the list's last readset, e.g., readset 600c, may store a predetermined "null" value to indicate that it is at the end of the list. While readsets in the illustrative embodiment are arranged as a linked list, those skilled in the art will appreciate that the readsets may be arranged in other configurations, such as a search tree.

The read-access style 406 stores a value indicating a read-access pattern that describes the manner by which data is read from the file or directory associated with the inode 400. For instance, the read-access style may indicate that data in the inode's file or directory will be read according to, e.g., a normal, sequential or random access pattern. The storage operating system 200 may dynamically identify and update the read-access pattern value 406 as it processes client read requests. Alternatively, the operating system may set the read-access value based on a "cache hint" or the like included in a received client read request. The cache hint indicates a read access pattern that the requesting client will likely employ to retrieve data from the file or directory. For example, the operating system may obtain the cache hint from a DAFS read request forwarded by a client. The DAFS protocol, including the DAFS cache hint, are described in more detail in *DAFS: Direct Access File System Protocol, Version* 1.00, published Sep. 1, 2001, which is hereby incorporated by reference as though fully set forth herein.

The default readahead value 408 indicates a predetermined number of data blocks that may be prefetched (i.e., read in advance) in anticipation of future client read requests for data stored in the inode 400's associated file or directory. For instance, the default readahead value 408 may indicate that after retrieving one or more data blocks containing client-requested data, the file system should retrieve an additional, e.g., 288 data blocks, in anticipation of future client read requests. Those skilled in the art will recognize that the "readahead" data blocks need not be retrieved after every client read request, and instead may be acquired based on a predetermined readahead algorithm. In accordance with the illustrative embodiment, the default readahead value 408 may depend on the read-access style 406. For example, the default readahead value may equal zero for random read access patterns and may equal a relatively larger value for sequential read accesses than for normal read accesses.

The file metadata 410 stores other metadata information related to the file or directory associated with the inode 400. Such metadata information may include, inter alia, security credentials, such as user identifiers and group identifiers, access control lists, flags, pointers to other data structures, and so forth. The inode 400 also includes a data section 412 including a set of pointers that (directly or indirectly) reference the memory locations of the data blocks 320 containing the inode's associated file or directory. In this example, the pointers in the data section 412 reference one or more indirect blocks (not shown), which in turn contain pointers that reference the memory locations of a set of contiguous data blocks containing the file or directory. Hereinafter, it is assumed that each of the data blocks accessible from the inode 400 is assigned a corresponding fbn and the file (or directory) associated with the inode 400 comprises a set of data blocks which are assigned consecutive fbn values. For example, some of the pointers in the data section 412 may reference a portion of the file stored in the data blocks assigned to the fbns numbered 9 through 18.

Advantageously, multiple read streams may be concurrently established among the data blocks 320 containing the inode 400's file or directory. As shown, for example, two concurrent read streams 430 and 435 are identified in the set of data blocks 9 through 18. The read stream 430 corresponds to a logically contiguous sequence of fbns retrieved by the file system 260 up to, but not including, the file block number 9. Similarly, the read stream 435 corresponds to a logically contiguous sequence of fbns retrieved up to, but not including, the file block number 15. In accordance with the illustrative embodiment, each of these read streams may be associated with a respective set of readahead metadata stored in a different one of the readsets 600*a-c*.

As noted, each readset is configured to store metadata associated with a corresponding read stream. Therefore, because the illustrative inode 400 is associated with three readsets 600*a-c*, the inode's associated file or directory can support up to three different read streams. However, it is expressly contemplated that the inode may be associated with an arbitrary number of zero or more allocated readsets 600. Preferably, the number of readsets allocated for the inode 400 is determined based on the size of the inode's associated file or directory. For example, as the file's size increases, the number of readsets allocated for the inode also may increase.

FIG. 5 illustrates an exemplary table 500 that may be used to correlate file sizes stored in column 510 with corresponding numbers of allocated readsets stored in column 520. In this example, a "tiny" file (e.g., <64 kB) may not contain enough data to establish any read streams and is therefore associated with zero readsets. On the other hand, a "small" file (e.g., 64 kB-512 kB) may be large enough to support a single read stream and is therefore associated with a single readset. Generally, as the file size increases, the number of read streams the file can support increases and thus the number of readsets allocated to the file's inode may also increase. The file system 260 may dynamically allocate more readsets as a file's size is dynamically increased, e.g., as a result of processing one or more client "write" requests.

FIG. 6 illustrates an exemplary readset 600 which may be accessed via the readset pointer 404. The readset contains metadata associated with a corresponding read stream, such as the read stream 430 or 435. The readset 600 may comprise, inter alia, a next pointer 602, a level value 604, a count value 606, a last read offset value 608, a last read size 610, a next readahead value 612, a readahead size 614 and various flags 616. Those skilled in the art will understand that the readset 600 also may be configured to store other information as well, besides that explicitly shown. As previously discussed, the next pointer 602 stores a value that indicates the memory location of an adjacent readset in a list (or other data structure) of readsets.

The level value 604 indicates the relative "age" of the readset 600. Preferably, the is level value is an integer value bounded between a predetermined upper-bound value and a predetermined lower-bound value, inclusive. For example, the level value 604 may be restricted to integer values between a predetermined lower-bound value equal to zero and a predetermined upper-bound value equal to 20. When the readset 600 is initially allocated, the level value 604 is set equal to a special indicator value, such as negative one, to indicate that the readset 600 is unused (i.e., empty). When the readset is associated with a newly identified read stream, the level value 604 is set equal to a predetermined "initial" value between the upper- and lower-bound values, inclusive. For example, when the predetermined lower- and upper-bound values respectively equal zero and 20, the initial level value may equal any value therebetween, such as 10. Preferably, the initial level values used for large files (or directories) associated with the readset 600 are greater than the initial level values used for smaller files to help prevent the readset from aging prematurely. For instance, the initial level value may be set equal to 15 for very large files (e.g., greater than 10 GB) and set equal to 10 otherwise. It is expressly contemplated that other upper-bound, lower-bound and initial level values may be employed in the context of the present invention.

Every time a client read request is processed by the file system 260, the file system increments the level value 604 in the readset associated with the read stream containing the client read request. Illustratively, when the level value 604 is incremented, it is increased by a first predetermined step size, e.g., equal to one. Further, whenever a readset is "reused," e.g., as discussed below, the file system decrements the level values 604 stored in every readset not selected for reuse. The level values 604 may be decremented by a second predetermined step size, e.g., equal to one.

By way of example, suppose the readset 600 stores a level value 604 equal to 12 and the file system 260 receives a file-system message corresponding to a client read request. If the file system determines that the client read request belongs to the read stream associated with the readset 600, then the level value 604 is incremented to equal 13. On the other hand, if the client read request is determined to belong to a different read stream, i.e., not associated with the readset 600, then the level value 604 is left unchanged, i.e., equal to 12. Further, if the received client read request results in the file system having to reuse a different readset, the level value 604 is decremented, e.g., to equal 11. The level value 604 may be adjusted (i.e., "aged") in this manner after every client read request is processed by the file system 260, until the readset 600 is deallocated or reused, as described below. This aging process may be subject to various conditions. For example, if the level value 604 is decremented to a value that is less than the predetermined initial value (e.g., equal to 10), then the next time the level value is incremented, the level value may be set equal to the predetermined initial level value. Further, the file system 260 may ensure that the level value 604 is not incremented past its predetermined upper-bound value nor decremented below its predetermined lower-bound value.

The count value 606 stores the number of client read requests that have been processed in the read stream associated with the readset 600. In the illustrative embodiment, the count value is initially set equal to zero. The count value is then incremented by one every time the file system 260 processes a client read request included in the readset's associated read stream. Like the level value 604, the count value 606 may be bounded by a predetermined upper-bound value, e.g., $2^{16}$, so as to conserve memory resources in the multiprotocol storage appliance 100.

The last read offset 608 and last read size 610 collectively describe the last (i.e., most recent) client read request processed in the read stream associated with the readset 600. Preferably, the last read offset 608 and last read size 610 store values in units of data blocks (e.g., fbns). For instance, suppose the file system 260 retrieves three data blocks, beginning with the file block number 6 (i.e., fbn numbers 6, 7 and 8), in response to processing the last client read request received in the read stream associated with the readset 600. In this case, the last read offset 608 is set equal to fbn number 6 and the last read size 610 is set equal to 3 data blocks. Accordingly, a future client read request may "extend" this read stream if it requires the file system to retrieve another sequence of logically contiguous data blocks beginning with the file block number 9.

The next readahead value 612 stores an indication of a predefined file offset or memory address where the file system 260 will perform its next set of readahead operations for the read stream associated with the readset 600. Specifically, when a client read request extends the read stream past the file offset or memory address indicated by the next readahead value 612, the file system may speculatively retrieve an additional set of readahead data blocks that further extend the read stream in anticipation of future client read requests. Having retrieved the readahead data blocks, the file system 260 may update the next readahead value 612 to indicate the next file offset or memory address where readahead operations will be performed for the read stream. After the readahead data blocks are retrieved, they are copied into appropriate in-core memory buffers in the memory 150 and the file system finishes processing the client read request.

The readahead size value 614 stores the number of readahead data blocks that is prefetched when the read stream is extended past the next readahead value 612. The readahead size value 614 may equal the default readahead value 408 or may be otherwise determined in accordance with a readahead algorithm. Illustratively, the readahead size value 614 and the next readahead value 612 are initialized to equal respective predetermined starting values when the readset is allocated. Then, after readahead operations are first performed for the readset, the file system may implement a "first time setup" procedure that selects appropriate readahead size and next readahead values. The first time setup procedure may be responsive to various input parameters, such as the value of a "read_full" flag or a "dump" flag. The read_full flag may be used to notify the first time setup procedure that the entire file or directory associated with the readset 600 is requested, e.g., by a client 190. The dump flag may indicate that a backup procedure is being performed to copy the file or directory associated with the readset 600 to a new location within the multiprotocol storage appliance 100.

Each readset 600 may include one or more flag values 616 that enable the file system 260 to specialize readahead operations for the readset's associated read stream. For instance, one of the flag values 616 may indicate in which "direction" the file system should retrieve data blocks for the read stream. That is, the file system may be configured to retrieve data blocks in a logical "forward" direction (i.e., in order of increasing file block numbers) or in a logical "backward" direction (i.e., in order of decreasing file block numbers). The readset 600 also may include a "read_once" flag 616 whose value indicates whether data retrieved in the readset's associated read stream is only accessed once by the file system, e.g., as part of a backup procedure or large file transfer. The value of the read_once flag 616 may be used to inform the file system 260 that the read stream's retrieved data does not have to be stored for a prolonged period of time in the memory 150. Other readset flags 616 may include, inter alia, a "large_volume" flag. The large_volume flag 616 may be set equal to a value that indicates that the volume containing the file or directory associated with the readset 600 comprises a relatively large number of storage disks 160 (e.g., more than 12 disks).

Figure 7:
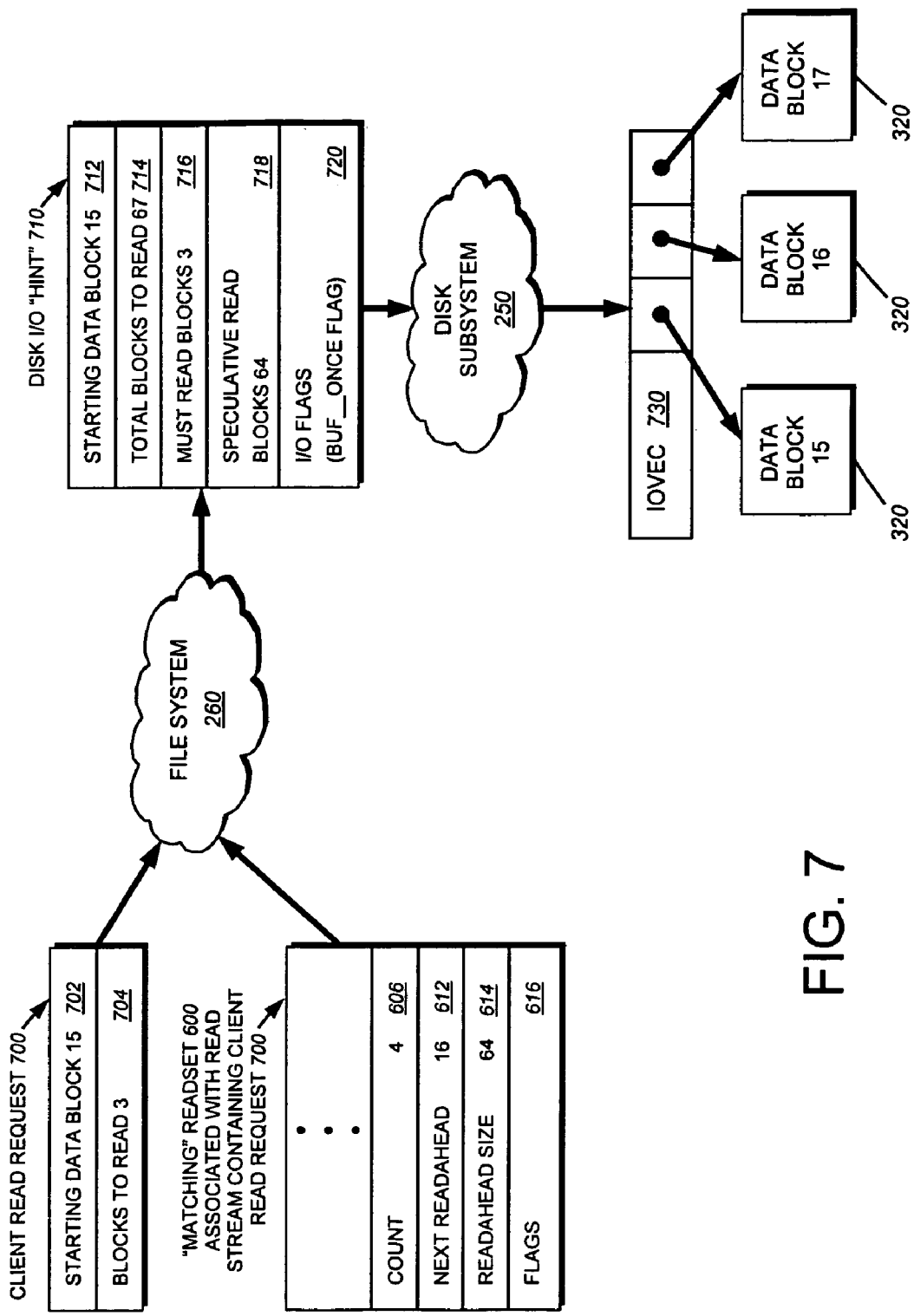
FIG. 7 is a schematic block diagram illustrating a disk I/O "hint" that may be used to retrieve data blocks from disk storage in accordance with the present invention.

FIG. 7 is a schematic block diagram illustrating a disk I/O "hint" 710 that may be generated by the file system 260 for retrieving data blocks 320 containing client-requested data and/or readahead data. In response to receiving a client read request 700, the file system may first attempt to locate the client-requested data blocks and their associated readahead blocks in one or more "in-core" memory buffers 1200. For those data blocks that are not located in the in-core buffers, the file system generates the disk I/O hint 710 to instruct the disk subsystem layers (e.g., RAID and SCSI layers 240 and 250) which data blocks to retrieve from the storage disks 160. The disk subsystems, in turn, retrieve the data blocks specified by the disk I/O hint 710 and load the retrieved data blocks into buffers 1200, e.g., acquired from the buffer cache 156. The buffers 1200 containing the data blocks 320 retrieved from the disks 160 or the memory 150 are accessible within the file system through an I/O vector 730 (or "iovec") which contains, inter alia, a set of pointers (or vbns) referencing the retrieved data blocks 320. The iovec 730 may also contain other metadata (not shown) associated with the client-requested data.

The file system 260 generates the disk I/O hint 710 based on the contents of the received client read request 700 and the contents of a readset 600 associated with the read stream containing the client read request 700. For purposes of explanation, assume the client read request 700 specifies a starting data block 702, e.g., fbn number 15, and a number of consecutive data blocks 704, e.g., 3 data blocks, requested by the client 190. Further, assume the client read request 700 extends a read stream past a next readahead value 612, e.g., equal to fbn number 16, thereby triggering readahead operations to retrieve a number of readahead blocks equal to a readahead size 614, e.g., 64 data blocks. Here, it is noted that while the contents of the illustrative request 700 is formatted in units of data blocks, other embodiments may require the file system 260 to convert the received file-system message into units of data blocks.

Illustratively, the disk I/O hint 710 contains, among other things, an indication of a starting data block 712, an indication of the total number of blocks to retrieve 714, an indication of how many of the data blocks to retrieve are "must-read" data blocks 716, an indication of how many of the data blocks to retrieve are "speculative" readahead data blocks 718 and zero or more I/O flag values 720. Those skilled in the art will appreciate that the disk I/O hint 710 is merely exemplary and may contain other information that is passed from the file system 260 to the disk subsystems 240 and 250.

The starting data block 712 in the disk I/O hint 710 corresponds to the starting data block 702 requested by the client. In the example shown, the starting data block number 712 is therefore set equal to the fbn number 15. The total number of blocks to read 714 indicates the number of logically contiguous data blocks (e.g., fbns) requested by the file system 260. The total number of blocks 714 includes not only the number of must-read data blocks 716 requested by the client, but also includes the number of speculative readahead data blocks 718 that are requested in anticipation of future client read requests to the same read stream. As shown, the total number of data blocks 714 indicates that the file system requests 67 logically contiguous data blocks from disk storage, beginning with the starting data block 712 (i.e., fbns 15 through 81). The number of must-read data blocks 716, e.g., 3 data blocks in this example, corresponds to the number of data blocks 704 requested by the client. The number of speculative data blocks 718, e.g., 64 data blocks, corresponds to the readahead size 614 stored in the readset 600 whose associated read stream contains the received client read request 700.

In accordance with the illustrative embodiment, the number of speculative data blocks 718 equals zero unless one or more "readahead" conditions are satisfied. If each of the readahead conditions is satisfied, then the file system 260 sets the number of readahead data blocks 718 in the disk I/O hint 710 equal to the readahead size value 614. For instance, a first readahead condition may require the count value 606 to be greater than a predetermined value, such as three, before readahead data blocks may be retrieved from disk. A second readahead condition may prohibit retrieval of readahead data blocks unless the range of data blocks (e.g., fbns) requested by the client read request 700 "extends" a read stream past an associated next readahead value 612. Yet a third readahead condition may require that the read-access style 406 associated with the client-requested file or directory not correspond to a random read access style.

The I/O flags 720 are used to communicate information to the disk subsystems 240 and 250 concerning how the file system's requested data blocks should be retrieved from the storage disks 160. Specifically, the I/O flags may be used to notify the disk subsystems of configuration settings that affect the manner in which the requested data blocks are retrieved. Illustratively, at least some of the I/O flags 720 coincide with flags 616 stored in the readset 600 whose associated read stream contains the client read request 700. For instance, the I/O flags 720 may include a "buf_once" flag corresponding to the value of a read_once flag 616. In this case, the buf_once flag 720 is used to indicate that the retrieved data blocks will only be read once, so the retrieved data may be stored in buffers 1200 configured to retain their data for a relatively shorter duration than conventional buffers used to store data that may be read more than once.

D. Adaptive Readahead

In accordance with an illustrative embodiment, the file system 260 is configured to optimize the amount of readahead data retrieved for each read stream managed by the file system. To that end, the file system relies on various factors to adaptively select an optimized readahead size 614 for each read stream. Such factors may include an amount of client-requested data requested in the read stream, a count value 606 indicating the number of read requests processed in the read stream, a read-access style 406 associated with the read stream's file or directory, and so forth.

Figure 8:
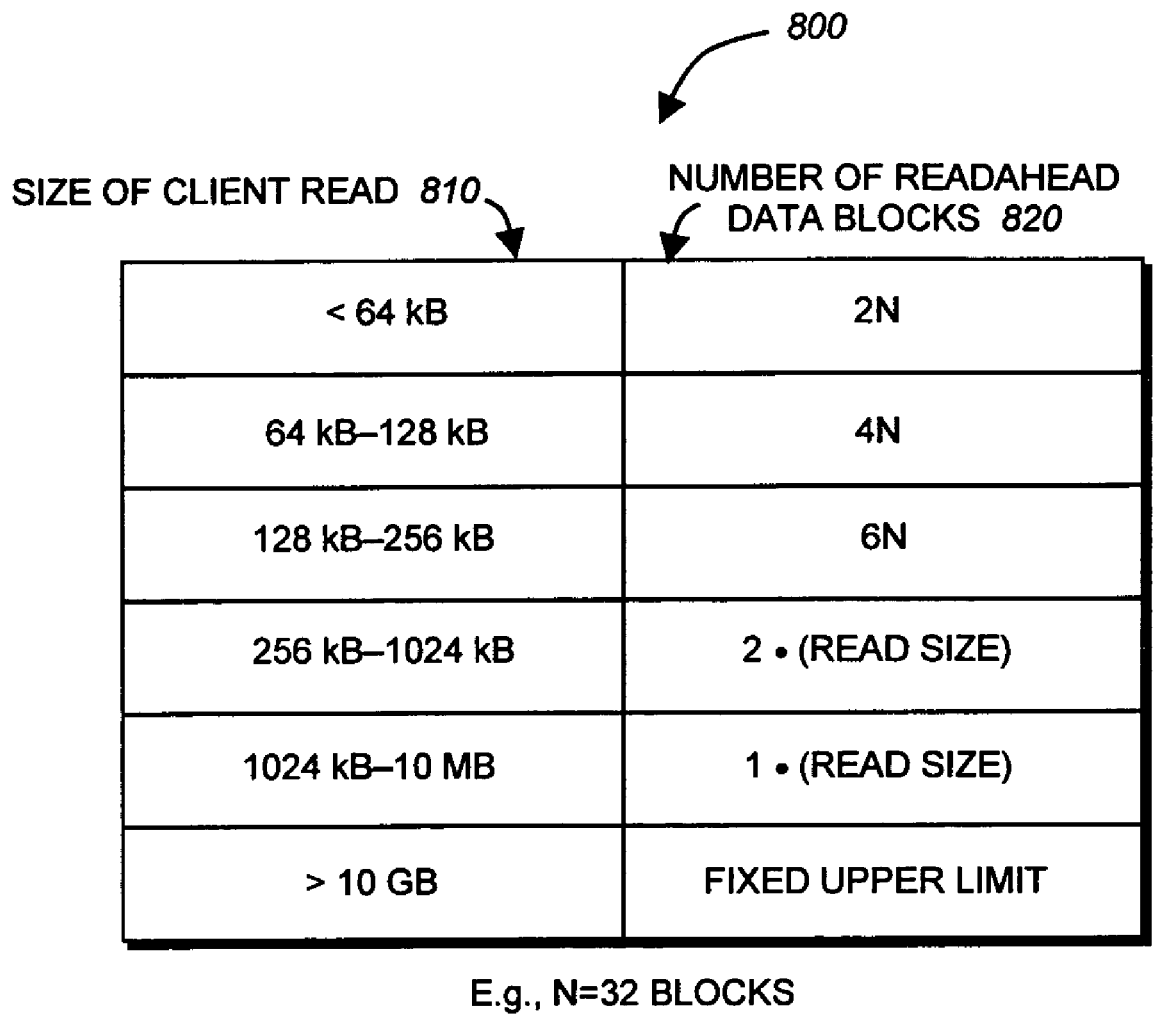
FIG. 8 is a schematic block diagram of an illustrative table that may be used in accordance with the present invention to adaptively select an amount of readahead data to retrieve from disk storage.

FIG. 8 is a schematic block diagram of an illustrative table 800 that may be used by the file system 260 to adaptively select a readahead size 614 associated with a read stream. Specifically, in response to receiving a client read request in the read stream, the file system can select a number of readahead data blocks 820 to speculatively retrieve based on the amount of client-requested data 810 requested in the received request. By way of example, if the client requests less than 64 kB of data, then the file system sets the readahead size 614 equal to two times a predetermined number N of data blocks, e.g., where N equals 32 data blocks. If the client requests more than 64 kB and less than 128 kB, then the readahead size 614 is set equal to four times the predetermined number of data blocks. Similarly, if the client requests between 128 kB and 256 kB of data, then the readahead size 614 is set equal to six times the predetermined number of data blocks.

For larger client reads, the file system may set the readahead size 614 equal to a multiple of the amount of client-requested data, rounded up (or down) to the nearest data block. For instance, if the client requests between 256 kB and 1024 kB, the file system sets the readahead size 614 to a file block number (fbn) closest to two times the amount of client-requested data. Likewise, in response to client requests for 1024 kB to 10 megabytes (Mb), the file system sets the readahead size 614 equal to the size of the read request, rounded to the size of a data block, e.g., 4 kB. For extremely large read sizes, such as greater than 10 Mb, the readahead size 614 may be set equal to a predetermined (i.e., fixed) upper limit on the number of data blocks that may be speculatively retrieved.

Here, it is further noted that the readahead size 614 may be selected based on other factors, as well. For instance, the value of the read_full flag may indicate that a client 190 will request the entire contents of the file or directory containing the read stream. In this case, the first time setup procedure may set the readahead size value 614 equal to a relatively large, fixed number of data blocks, such as 256 data blocks. Additionally, if the value of the dump flag indicates that a backup operation is being performed for the file or directory, then the readahead size 614 may be set to an even larger (i.e., more "aggressive") fixed number of data blocks, e.g., equal to 1024 data blocks.

Although the table 800 illustrates a relatively simple procedure for determining the number of readahead data blocks 820 based on the size of a received client read request 810, those skilled in the art will appreciate that more sophisticated algorithms may be employed. For example, a "slow-start" algorithm may be implemented for "semi-random" reads to a file or directory, such that the client performs intermittent "bursts" of relatively short sequences of relatively small reads, e.g., around three to six reads of less than 32 kB. For this algorithm, when readahead operations are first performed for the read stream, the first time setup procedure may initially set the readahead size 614 equal to, e.g., three times the read size rounded to the nearest data block or six data blocks, whichever is larger. When the read stream is extended past its next readahead value 612, the readahead size value 614 may be increased by a predetermined factor, e.g., such as 1.5, or alternatively set equal to a fixed number of data blocks, such as 64 data blocks. In this manner, the slow-start algorithm retrieves fewer readahead data blocks for the first few reads in the read stream, then increases the amount of readahead data blocks retrieved for the read stream's subsequent readahead operations.

Figure 9:
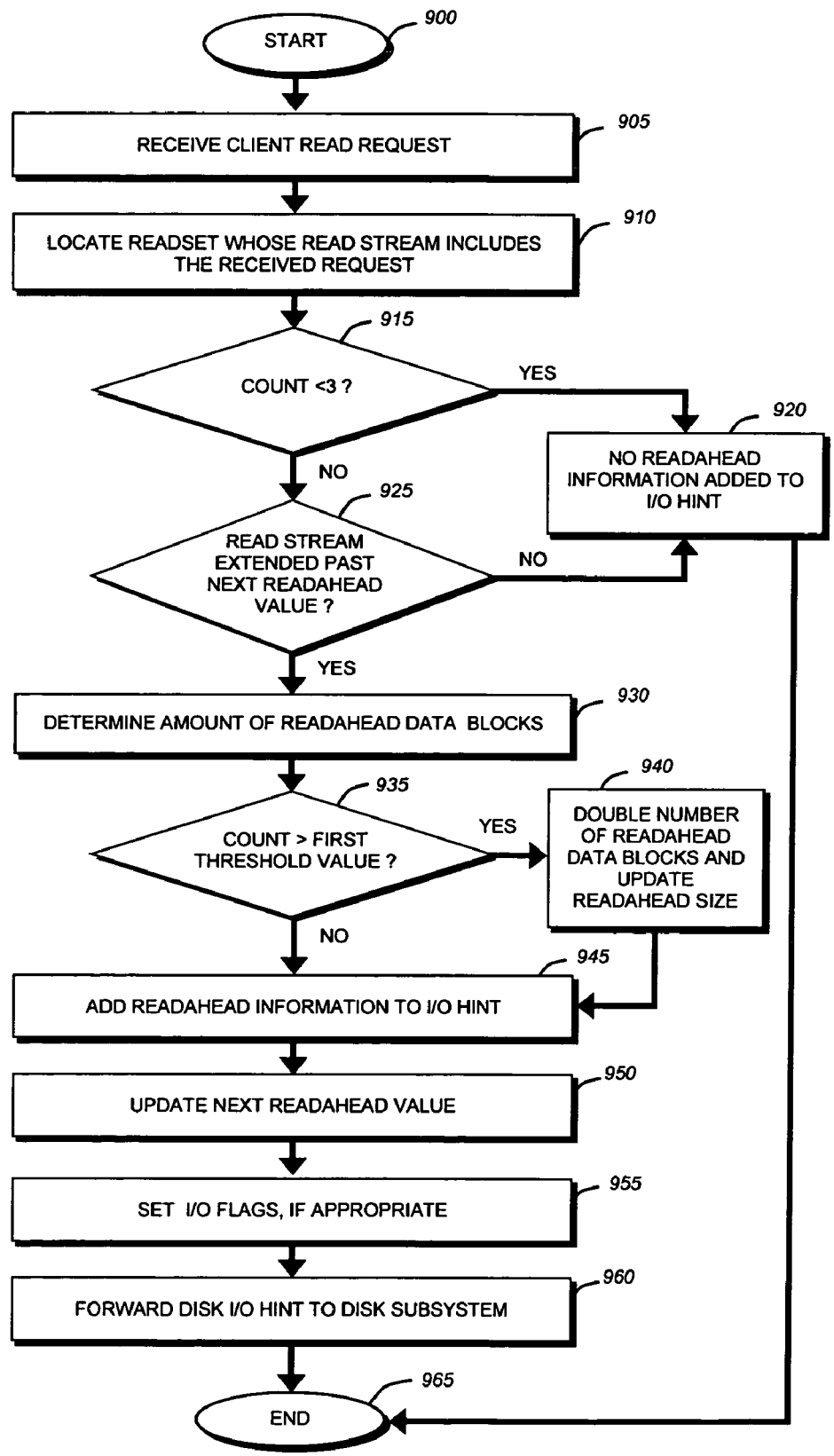
FIGS. 9A-B are flowcharts comprising a sequence of steps for generating a disk I/O hint in which the number of readahead data blocks is adaptively selected.

FIGS. 9A-B are flowcharts illustrating a sequence of steps that the file system 260 may employ for generating a disk I/O hint 710 in which the number of readahead data blocks 718 is adaptively selected in response to receiving a client read request 700. The sequence starts at step 900 and proceeds to step 905 where the client read request is received at a network adapter 120, 140 in the multiprotocol appliance 100. The received request is processed by one or more network protocol layers in the storage operating system 200 and forwarded to the file system 260. At step 910, the file system locates a readset 600 whose read stream includes the request 700. For instance, the file system may identify the readset that "matches" the received request based on whether the readset's associated read stream contains a logical sequence of data blocks (e.g., fbns) that is extended by data blocks containing the client's requested data.

Next, at step 915, the file system 260 determines whether readahead operations may be performed in response to the received client read request 700. Specifically, the file system determines whether the data blocks (e.g., fbns) containing the client-requested data extend the read stream past a next readahead value 612 stored in the matching readset 600. If so, the file system determines that readahead operations can be performed, as set forth by steps 920-955. On the other hand, if the read stream is not extended past its next readahead value 612, then it is determined that readahead operations are not permitted to be performed. In this case, the sequence advances to step 925 where no readahead information is added to the disk I/O hint 710 and the sequence is directed to step 960.

When the received request 700 is determined to extend its read stream past the next readahead value 612, the file system 260 considers various factors in steps 920 through 945 to determine the number of readahead data blocks 718 to specify in the disk I/O hint 710. At step 920, the file system determines whether the client read request 700 requests data in a file or directory whose read-access style 406 prohibits readahead operations, or whether the received request contains a DAFS cache hint, or the like, corresponding to a read-access style for which readahead operations should not be performed. For example, the file system may determine no readahead is performed if the read-access style 406 of the client-requested data corresponds to a "random" read-access style. In this case, the sequence advances to step 925 where the number of speculative readahead blocks 718 in the disk I/O hint 710 is set equal to zero and the sequence advances to step 960.

If, at step 920, the read-access style does not prohibit readahead operations, then at step 930 the file system determines whether the count value 606 in the located readset 600 is greater than or equal to a predetermined value, such as three. If the count value is less than the predetermined value, the file system determines that not enough client read requests have been received in the read stream to justify speculative readahead operations. Consequently, at step 925, the file system does not specify any readahead data blocks to retrieve in the disk I/O hint 710, i.e., the number of speculative readahead blocks 718 is set equal to zero, and the sequence proceeds to step 960. Here, it is noted that step 930 may be by-passed ("skipped") if either the read_full flag or the dump flag indicates that the entire file or directory containing the read stream will be requested. In such a scenario, speculative readahead operations may be performed without having to wait for the predetermined number of read requests to be processed.

If at step 930 the count value 606 is greater than or equal to the predetermined value (e.g., three), the file system determines a number of readahead data blocks 718 to specify in the disk I/O hint 710, at step 935. To that end, the file system may rely on, e.g., the table 800 to select a number of readahead data blocks 718 as a function of the amount of data requested in the client request 700. The file system may additionally rely on other factors, such as the value of the read_full and dump flags, to determine the number of readahead data blocks 718. Further, the file system may employ a readahead algorithm, such as the slow-start algorithm, to determined the number of readahead data blocks. If the selected number of readahead data blocks 718 is different than the readahead size 614 previously associated with the client-requested read stream, the read stream's readahead size 614 is updated to equal the selected number of readahead data blocks 718.

At step 940, the file system 260 determines whether the count value 606 in the located readset is greater than a first threshold value, e.g., equal to 50. If it is, the file system determines that the read stream has been accessed often enough to justify increasing the amount of readahead data blocks 718, e.g., by a factor of two, at step 945. Further, if the large_volume flag 616 indicates that the read stream is established in a volume having a large number of storage disks 160, then at step 945 the number of readahead data blocks 718 may be further adjusted to optimize data retrieval from the multiple disks. In either case, the number of readahead data blocks 718 is appropriately increased in the disk I/O hint 710 and the readahead size 614 for the read stream is also set equal to the increased number of readahead data blocks 718.

Next, at step 950, the number of readahead data blocks 718 is incorporated into the disk I/O hint 710. Specifically, the total number of blocks to read 714 is adjusted to include both the client-requested must-read data blocks 716 as well as the number of speculative readahead data blocks 718 determined by the steps 920-945. Here, it is noted that the file system 260 searches the buffer cache 156 to determine whether any of the requested data blocks are already stored in in-core buffers 1200. If so, the file system appropriately adjusts the disk I/O hint 710 to retrieve only those data blocks not already accessible in the buffer cache. Moreover, the file system may have to generate more than one disk I/O hint 710 if more than one non-contiguous sequence of file data blocks (i.e., fbns) are requested from disk storage.

Figure 10:
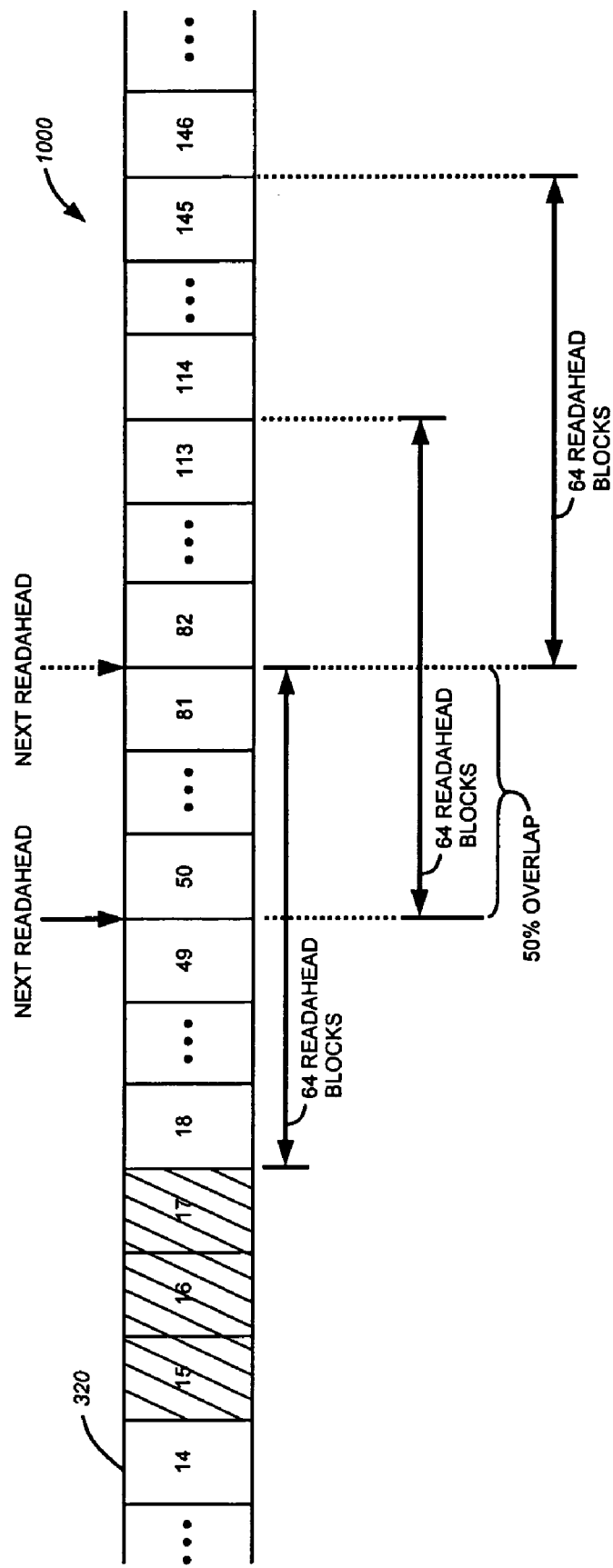
FIG. 10 is a schematic block diagram of an exemplary file read stream whose next readahead value is determined based on a predetermined percentage of a readahead size.

At step 955, the file system 260 updates the next readahead value 612. According to an aspect of the illustrative embodiment, the next readahead value is updated so as to minimize cache pollution in the buffer cache. By way of example, FIG. 10 illustrates a technique for setting the next readahead value 612 based on a predetermined percentage of the readahead size 614. FIG. 10 illustrates a portion of a file 1000 comprising a sequence of data blocks 320 assigned to consecutive fbns. As shown, file readahead is performed after the fbn numbers 15 through 17 are retrieved by the file system 260, where the file's associated readahead size 614 is equal to 64 data blocks. Accordingly, the data blocks assigned to fbn numbers 18 through 81 are prefetched.

In addition, the next readahead value 612 is adjusted by a number of data blocks equal to a predetermined percentage (e.g., 50%) of the readahead size 614. Advantageously, by setting the next readahead value 612 as a fraction of the readahead size, the file system performs the next set of readahead operations prior to reaching the last prefetched data block (e.g., fbn number 81), thereby increasing the likelihood that some of the prefetched data blocks will still reside in memory when the next set of readahead operations is performed. As such, the latency of retrieving readahead data blocks from disk storage can be reduced during the next set of readahead operations and cache pollution lessened.

For instance, if a first set of readahead operations retrieves the data blocks assigned to fbn numbers 18 through 81 and sets the next readahead value 612 equal to fbn number 50 (i.e., 50% of the 64 readahead data blocks), then the next set of readahead operations will be performed when the read stream is extended past the fbn number 50. Illustratively, the next set of readahead operations may retrieve the 64 readahead data blocks assigned to fbn numbers 50 through 113. Because the range of readahead data blocks (i.e., fbn numbers 50 through 113) retrieved by the next set of readahead operations overlaps the previous set of readahead data blocks (i.e., fbn numbers 18 through 81), the overlapping range of data blocks (i.e., fbn numbers 50 through 81) may already reside in the buffer cache when the next set of readahead operations is performed. Accordingly, fewer readahead data blocks may have to be retrieved from the disks 160, thereby reducing cache pollution in the buffer cache.

Figure 11:
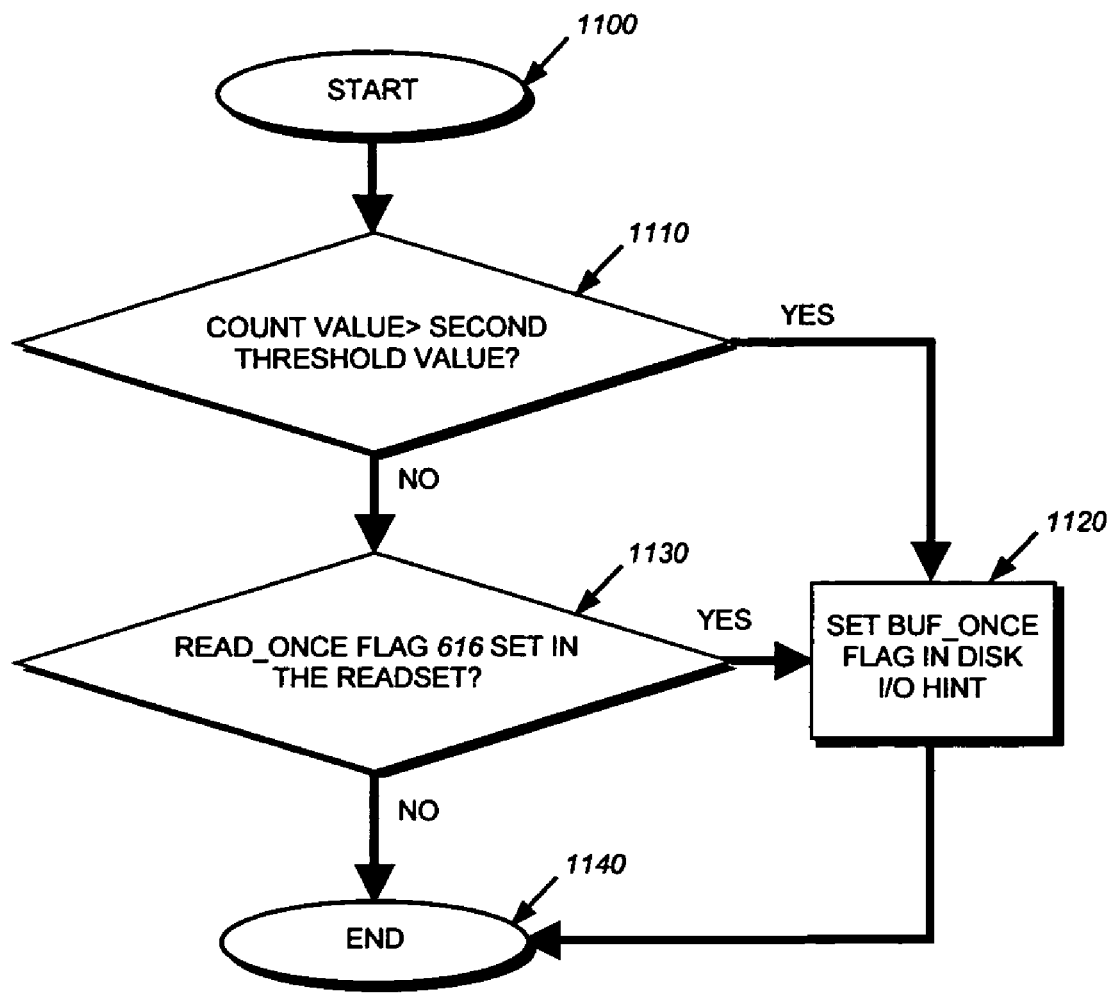
FIG. 11 is a flowchart comprising a sequence of steps for setting the value of a "buf_once" flag in a disk I/O hint.

At step 960, the file system 260 may set the values of one or more I/O flags 720 in the disk I/O hint 710, if appropriate. For instance, a direction flag 720 may be set equal to a value that notifies the disk subsystems 240 and 250 in which logical direction the requested file block numbers span. FIG. 11 illustrates a sequence of steps that may be employed by the file system for setting a buf_once flag 720. The value of the buf_once flag 720 informs the disk subsystems 240 and 250 whether the requested data blocks contain "read once" data. The sequence starts at step 1100 and proceeds to step 1110 where the file system determines whether the count value 606 associated with a client-requested read stream is greater than a second threshold value, e.g., equal to 50. If so, the file system determines that a sufficiently large number of read requests have been processed in the read stream to conclude that the read stream corresponds to a large, read-once data transfer, such as a backup operation. In this case, the sequence advances to step 1120 where the buf_once flag 720 is set equal to a value that indicates the requested data is read-once data, and the sequence ends at step 1140.

If, at step 1110, the count value 606 is not greater than the second threshold value, then at step 1130 the file system 260 determines whether a read_once flag 616 in the readset 600 associated with the read stream equals a value corresponding to a read-once data transfer. For example, the value of the read_once flag 616 may have been set based on the value of a read-access style 406 or DAFS cache hint associated with the client-requested data. If the read_once flag 616 does not indicate that read-once data is being retrieved, then the sequence ends at step 1140. Otherwise, at step 1120, the buf_once flag 720 is set in the disk I/O hint 710, then the sequence ends at step 1140.

After the I/O flags 720 have been appropriately adjusted, at step 965 the disk I/O hint 710 is forwarded to the disk subsystem layers 240 and 250 which, in turn, retrieve the must-read data blocks 716 and the readahead data blocks 718 from the storage disks 160. The retrieved data blocks are copied into in-core data buffers 1200 which then may be referenced by pointers in an iovec 730 corresponding to the received client read request 700. As described below, the data buffers 1200 may be stored in either a "flush" queue 1210 or a "normal" queue 1220. The flush queue 1210 is used to reduce cache pollution by storing read-once data and readahead data for a relatively shorter duration than client-requested data stored in the normal queue 1220. Thus, the buffers 1200 are stored in the flush queue when they contain readahead data or when the buf_once flag 720 is set in the disk I/O hint 710. The sequence ends at step 970.

Figure 12:
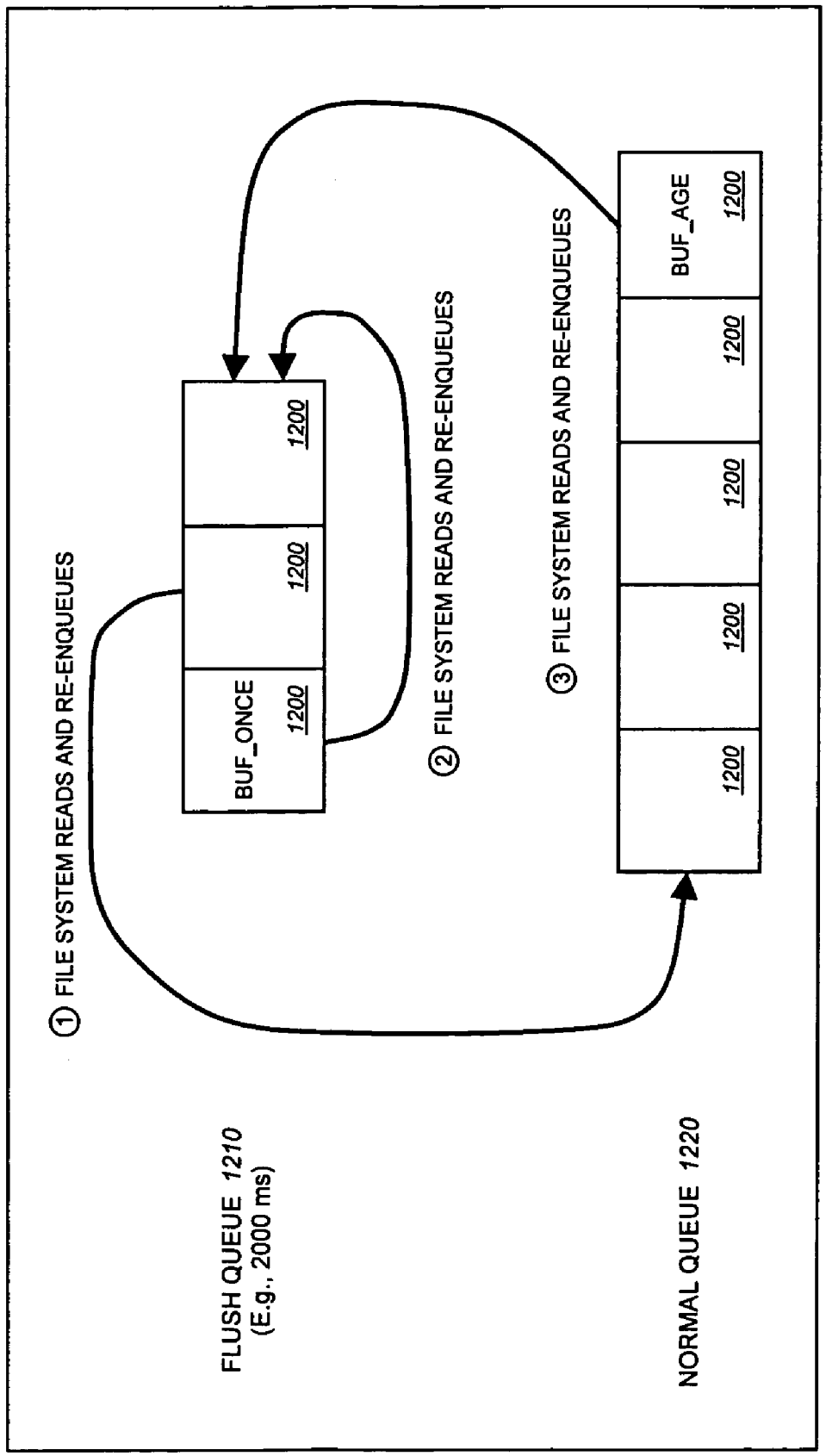
FIG. 12 is a schematic block diagram illustrating an exemplary flush queue and normal queue that may be employed for managing data buffers in accordance with the present invention.

FIG. 12 is a schematic block diagram illustrating the flush queue 1210 and the normal queue 1220 that may be employed for managing buffers 1200 in the buffer cache 156. Illustratively, buffers 1200 containing readahead data are stored in the flush queue, which is a first-in, first-out queue that "flushes" buffers from the queue after a predetermined "flush_threshold" time period, e.g., 2 seconds. Buffers containing the client-requested data are typically stored in the normal queue 1220, unless the buf_once flag 720 is set in the disk I/O hint 710. In that case, the buffers are queued on the flush queue 1210.

In operation, the flush queue 1210 is used to acquire a buffer 1200 for storing a newly retrieved data block when either (i) the normal queue is empty or (ii) the buffer at the head of the flush queue is "older" than that at the head of the normal queue or (iii) the buffer at the head of the flush queue is older than the predetermined flush_threshold time period. After a buffer has been accessed from the flush queue 1210, it is typically re-enqueued on the normal queue 1220 until the buffer has "aged" and thus become eligible for reuse (Step 1 in FIG. 12). Similarly, buffers 1200 accessed in the normal queue 1220 are re-enqueued on the normal queue until they are aged.

Conventional buffer aging policies may be implemented to keep track of each buffer's relative age. Accordingly, each buffer 1200 may include a "buf_age" flag that indicates when the buffer is eligible for reuse. A buffer's buf_age flag may equal a first value until data stored in the buffer has been retained in the buffer cache for a predetermined amount of time, after which time the buf_age flag may be set equal to a second value. Accordingly, a buffer 1200 whose buf_age flag is set equal to the second value is enqueued at the head (i.e., the front) of the flush queue 1210 the next time it is accessed and re-enqueued (Step 2 in FIG. 12).

According to the illustrative embodiment, each buffer 1200 also includes a "buf_once" flag that is used to indicate whether the buffer contains read-once data. Thus, the buf_once flag in the buffer 1200 equals a first value when it contains data that may be read many times. On the other hand, the buf_once flag in the buffer 1200 equals a second value when the buffer stores read-once data, e.g., which may be identified by the value of the buf_once flag 720 in the disk I/O hint 710. When the buf_once flag in the buffer 1200 equals its second value, the buffer is enqueued in the flush queue 1210 where it remains until its contents are read for the first time. After being read for the first time, the buffer's buf_age flag is set equal to its second value indicating that the buffer is aged, and the buffer is then re-enqueued at the head of the flush queue 1210 (Step 3 in FIG. 12).

E. Conclusion

The foregoing has been a detailed description of an illustrative embodiment of the invention. Various modifications and additions can be made without departing from the spirit and scope of the invention. As noted, files and directories in the illustrative embodiment are broadly defined as any set of data in which zero or more read streams can be established. Accordingly, a file in this context may be embodied as a "virtual disk" (vdisk) that corresponds to a predefined set of data blocks that can be exported to block-based clients 190*b* as a single logical unit number (lun), even though the data blocks in the virtual disk are accessed using file-based semantics within the multiprotocol storage appliance 100. In this manner, the block-based clients can format their requests in accordance with a conventional block-based protocol, such as the FCP or iSCSI protocol, whereas the requests are processed by a virtualization system implemented by the storage operating system 200 using file-based semantics. In general, files and directories in the illustrative embodiment may be any data container, such as a file, directory, vdisk or lun, in which zero or more read streams can be established.

Although the illustrative embodiments depict read streams, e.g., read streams 430 and 435, that extend in a "forward" direction (e.g., in order of increasing file block numbers), those skilled in the art will appreciate that the inventive concepts set forth herein are equally applicable for read streams that extend in a "backward" direction (e.g., in order of decreasing file block numbers). To that end, a flag 616 in each readset may be set equal to a first value to indicate that the readset's associated read stream extends in the forward direction and may equal a second value to indicate that the read stream extends in the backward direction. Accordingly, the file system retrieves readahead data blocks for a read stream in the direction in which the read stream extends, e.g., as specified by the appropriate flag 616.

While this description has been written in reference to a multiprotocol storage appliance 100, the principles are equally pertinent to all types of computers, including those configured for block-based storage systems (such as storage area networks), file-based storage systems (such as network attached storage systems), combinations of both types of storage systems (such as multiprotocol storage appliances), and other forms of computer systems. It is also expressly contemplated that the teachings of this invention can be implemented as software, including a computer-readable medium having program instructions executing on a computer, hardware, firmware, or a combination thereof. Moreover, those skilled in the art will also understand that the teachings set forth herein are not limited to any specific operating system (OS) implementation, and instead may be executed by a wide variety of OS platforms. Accordingly this description is meant to be taken only by way of example and not to otherwise limit the scope of the invention.

What is claimed is:

1. A method for a storage operating system implemented in a storage system to optimize an amount of readahead data retrieved from a data container of the storage system, comprising:

managing a separate set of readahead metadata for each individual read stream of a plurality of read streams, wherein the read stream is a set of one or more client read requests to retrieve data from a contiguous range of file offsets within a requested file;

storing the separate set of readahead metadata in a corresponding individual readset data structure for the each individual read stream;

maintaining, in the individual readset data structure, a plurality of factors for the each read stream, the plurality of factors determining the amount of readahead data retrieved from the data container the one or more client read requests;

receiving a client read request associated with a particular read stream at the storage system and determining an amount of readahead data to retrieve from the data container for the particular read stream;

receiving a next client read request associated with the particular read stream;

locating a readset data structure for the particular read stream;

determining whether the storage operating system is permitted to retrieve readahead data from the data container in response to the received next client read request; and if it is determined that the storage operating system is permitted to retrieve readahead data from the data container, performing the steps of, (i) modifying one or more of the plurality of factors stored within the readset data structure for the particular read stream;

(ii) adjusting, in response to modifying the one or more factors, an amount of readahead data to retrieve for the next client read request associated with the particular read stream, wherein the amount of readahead data to retrieve for the next client read request is different from the amount of readahead data retrieved for the client read request;

(iii) retrieving the adjusted amount of readahead data from the data container; and (iv) determining if the readset data structure meets a criteria for being updated, and if the readset data structure meets the criteria then updating the readset data structure.

2. The method of claim 1, wherein the data container is a file, directory, vdisk or lun.

3. The method of claim 1, wherein the storage operating system is determined to be permitted to retrieve readahead data from the data container when the client-requested data extends the read stream past a predetermined next readahead value.

4. The method of claim 3, wherein the predetermined next readahead value is stored in a readset data structure associated with the read stream.

5. The method of claim 3, wherein the predetermined next readahead value is updated based on a percentage of the adjusted amount of readahead data.

6. The method of claim 1, wherein a read-access style associated with the data container is one of the plurality of factors used to select the amount of readahead data.

7. The method of claim 6, wherein the adjusted amount of readahead data equals zero if the read-access style corresponds to a random read-access style.

8. The method of claim 1, wherein a number of client read requests processed in the read stream is one of the plurality of factors used to select the amount of readahead data.

9. The method of claim 8, wherein the number of client read requests processed in the read stream is stored as a count value in a readset data structure associated with the read stream.

10. The method of claim 1, wherein the amount of client-requested data is one of the plurality of factors used to select the amount of readahead data.

11. The method of claim 10, wherein the adjusted amount of readahead data is set equal to a predetermined upper limit for large amounts of client-requested data.

12. The method of claim 1, wherein the adjusted amount of readahead data is doubled if the number of client read requests processed in the read stream is greater than a first threshold value.

13. The method of claim 1, wherein the client-requested data is identified as read-once data when either (i) the number of client read requests processed in the read stream is greater than a second threshold value or (ii) a set of metadata associated with the read stream indicates that the client-requested data is read-once data.

14. The method of claim 1, wherein the adjusted amount of readahead data is stored in one or more buffers enqueued on a flush queue, the flush queue being configured to reuse buffers after a predetermined period of time.

15. The method of claim 14, wherein the predetermined period of time equals two seconds.

16. An apparatus configured to implement a storage operating system that optimizes an amount of readahead data retrieved from a data container of the apparatus, comprising:
- means for managing a separate set of readahead metadata for each individual read stream of a plurality of read streams, wherein the read stream is a set of one or more client read requests to retrieve data from a contiguous range of file offsets within a requested file;
- means for storing the separate set of readahead metadata in a corresponding individual readset data structure for the each individual read stream;
- means for maintaining, in the individual readset data structure, a plurality of factors for the each read stream, the plurality of factors determining the amount of readahead data retrieved from the data container the one or more client read requests;
- means for receiving a client read request associated with a particular read stream at the storage system and determining an amount of readahead data to retrieve from the data container for the particular read stream;
- means for receiving a next client read request associated with the particular read stream;
- means for locating a readset data structure for the particular read stream;
- means for determining whether the storage operating system is permitted to retrieve readahead data from the data container in response to the received next client read request; and
- if it is determined that the storage operating system is permitted to retrieve readahead data from the data container,
  (i) means for modifying one or more of the plurality of factors stored within the readset data structure for the particular read stream;
  (ii) means for adjusting, in response to modifying the one or more factors, an amount of readahead data to retrieve for the next client read request associated with the particular read stream, wherein the amount of readahead data to retrieve for the next client read request is different from the amount of readahead data retrieved for the client read request;
  (iii) means for retrieving the adjusted amount of readahead data from the data container; and
  (iv) means for determining if the readset data structure meets a criteria for being updated, and if the readset data structure meets the criteria then updating the readset data structure.

17. The apparatus of claim 16, wherein the data container is a file, directory, vdisk or lun.

18. The apparatus of claim 16, wherein the storage operating system is determined to be permitted to retrieve readahead data from the data container when the client-requested data extends the read stream past a predetermined next readahead value.

19. The apparatus of claim 18, further comprising means for updating the predetermined next readahead value based on a percentage of the adjusted amount of readahead data.

20. The apparatus of claim 16, wherein the plurality of factors used to select the amount of readahead data includes at least one of:
  (i) the amount of client-requested data,
  (ii) a number of client read requests processed in the read stream, and
  (iii) a read-access style associated with the data container.

21. The apparatus of claim 16, wherein the adjusted amount of readahead data is doubled if the number of client read requests processed in the read stream is greater than a first threshold value.

22. A storage system configured to optimize an amount of readahead data retrieved from a data container of the storage system, the storage system comprising:
- a network adapter for receiving a client read request for a particular read stream;
- a memory configured to store instructions for implementing a storage operating system that performs the steps of:
  managing a separate set of readahead metadata for each individual read stream of a plurality of read streams, wherein the read stream is a set of one or more client read requests to retrieve data from a contiguous range of file offsets within a requested file;
  storing the separate set of readahead metadata in a corresponding individual readset data structure for the each individual read stream;
  maintaining, in the individual readset data structure, a plurality of factors for the each read stream, the plurality of factors determining the amount of readahead data retrieved from the data container the one or more client read requests;
  receiving a client read request associated with a particular read stream at the storage system and determining an amount of readahead data to retrieve from the data container for the particular read stream;
  receiving a next client read request associated with the particular read stream;
  locating a readset data structure for the particular read stream;
  determining whether the storage operating system is permitted to retrieve readahead data from the data container in response to the received next client read request; and
  if it is determined that the storage operating system is permitted to retrieve readahead data from the data container, performing the steps of,
    (i) modifying one or more of the plurality of factors stored within the readset data structure for the particular read stream;
    (ii) adjusting, in response to modifying the one or more factors, an amount of readahead data to retrieve for the next client read request associated with the particular read stream, wherein the amount of readahead data to retrieve for the next client read request is different from the amount of readahead data retrieved for the client read request;
    (iii) retrieving the adjusted amount of readahead data from the data container; and (iv) determining if the readset data structure meets a criteria for being updated, and if the readset data structure meets the criteria then updating the readset data structure.

23. The storage system of claim 22, wherein the data container is a file, directory, vdisk or lun.

24. The storage system of claim 22, wherein the storage operating system is determined to be permitted to retrieve readahead data from the data container when the client-requested data extends the read stream past a predetermined next readahead value.

25. The storage system of claim 24, wherein the predetermined next readahead value is updated based on a percentage of the adjusted amount of readahead data.

26. The storage system of claim 22, wherein the plurality of factors used to select the amount of readahead data includes at least one of:
   (i) the amount of client-requested data,
   (ii) a number of client read requests processed in the read stream, and
   (iii) a read-access style associated with the data container.

27. The storage system of claim 22, wherein the adjusted amount of readahead data is doubled if the number of client read requests processed in the read stream is greater than a first threshold value.

28. A computer-readable media containing program instructions executed by a processor, comprising:
   program instructions that manage a separate set of readahead metadata for each individual read stream of a plurality of read streams, wherein the read stream is a set of one or more client read requests to retrieve data from a contiguous range of file offsets within a requested file;
   program instructions that store the separate set of readahead metadata in a corresponding individual readset data structure for the each individual read stream;
   program instructions that maintain, in the individual readset data structure, a plurality of factors for the each read stream, the plurality of factors determining the amount of readahead data retrieved from the data container the one or more client read requests;
   program instructions that receive a client read request associated with a particular read stream at the storage system and determining an amount of readahead data to retrieve from the data container for the particular read stream;
   program instructions that receive a next client read request associated with the particular read stream;
   program instructions that locate a readset data structure for the particular read stream;
   program instructions that determine whether the storage operating system is permitted to retrieve readahead data from the data container in response to the received next client read request; and
   if it is determined that the storage operating system is permitted to retrieve readahead data from the data container, program instructions that,
   (i) modify one or more of the plurality of factors stored within the readset data structure for the particular read stream;
   (ii) adjust, in response to modifying the one or more factors, an amount of readahead data to retrieve for the next client read request associated with the particular read stream, wherein the amount of readahead data to retrieve for the next client read request is different from the amount of readahead data retrieved for the client read request;
   (iii) retrieve the adjusted amount of readahead data from the data container; and
   (iv) determine if the readset data structure meets a criteria for being updated, and if the readset data structure meets the criteria then update the readset data structure.

29. The computer-readable media of claim 28, wherein the data container is a file, directory, vdisk or lun.

30. The method of claim 1, wherein the retrieved readahead data is stored in one or more buffers, the buffers containing a flush queue, the flush queue being configured to reuse buffers after a predetermined period of time.

31. The method of claim 30, wherein the read stream corresponds to a read-once data transfer and data retrieved from the data container is stored in the flush queue.

32. The method of claim 30, wherein the retrieved readahead data is stored in the flush queue.

33. The method of claim 30, wherein one or more buffers accessed from the flush queue are re-enqueued on a normal queue.

* * * * *